United States Patent
Weber

(10) Patent No.: US 7,526,131 B2
(45) Date of Patent: Apr. 28, 2009

(54) IMAGE PROCESSING APPARATUS AND METHODS

(76) Inventor: Martin Weber, 26 Church Street, Fen Ditton, Cambridge, Cambridgeshire CB5 8SU (GB)

( * ) Notice: Subject to any disclaimer, the term of this patent is extended or adjusted under 35 U.S.C. 154(b) by 566 days.

(21) Appl. No.: 11/220,371

(22) Filed: Sep. 6, 2005

(65) Prior Publication Data

US 2008/0069445 A1    Mar. 20, 2008

Related U.S. Application Data

(63) Continuation of application No. PCT/GB2004/000988, filed on Mar. 8, 2004.

(51) Int. Cl.
*G06K 9/48* (2006.01)

(52) U.S. Cl. ........................ 382/199; 345/420; 345/442; 382/103; 382/154; 382/203; 382/266

(58) Field of Classification Search ................ 345/419, 345/420, 424, 427, 428, 442, 441; 382/103, 382/181, 190, 240, 243, 266, 154, 199, 203
See application file for complete search history.

(56) References Cited

U.S. PATENT DOCUMENTS

| | | | | |
|---|---|---|---|---|
| 5,990,900 | A * | 11/1999 | Seago | 345/427 |
| 6,259,802 | B1 * | 7/2001 | Jolly et al. | 382/103 |
| 6,937,235 | B2 * | 8/2005 | Fujiwara et al. | 345/420 |
| 6,947,040 | B2 * | 9/2005 | Tek et al. | 345/420 |
| 7,031,538 | B2 * | 4/2006 | Osher et al. | 382/243 |
| 7,079,674 | B2 * | 7/2006 | Paragios et al. | 382/128 |
| 7,174,039 | B2 * | 2/2007 | Koo et al. | 382/154 |
| 7,230,616 | B2 * | 6/2007 | Taubin | 345/424 |
| 2007/0136034 | A1 * | 6/2007 | Kim et al. | 703/2 |
| 2007/0165948 | A1 * | 7/2007 | Laffargue et al. | 382/173 |
| 2008/0069445 | A1 * | 3/2008 | Weber | 382/181 |

* cited by examiner

*Primary Examiner*—Gregory M Desire

(57) ABSTRACT

A method is provided of processing digital image data representing an image of an object to determine data representing a boundary for said object, the method comprising: inputting said image data; initializing a level set function representation of an interface for approximating said boundary; determining a motion of said interface subject to a combined cost function comprising a first cost comprising a signed distance constraint on said interface level set function representation and a second cost comprising a measure of said interface responsive to a density or metric of said image; modifying said level set function representation of said interface in accordance with said determined motion; repeating said determining and modifying such that said interface converges on said boundary; and determining boundary data representing said boundary from said converged level set function interface representation.

21 Claims, 9 Drawing Sheets

(a) (b) (c)

(a) (b) (c)

IMAGE PROCESSING APPARATUS AND METHODS

This application is a continuation under 35 U.S.C. 111(a) of PCT/GB2004/000988, filed Mar. 8, 2004 and published as WO 2004/079654 A2, filed Sep. 16, 2004, which claimed priority under 35 U.S.C. 119 to United Kingdom Application No. 0305315.4, filed Mar. 7, 2003, which applications and publication are incorporated herein by reference and made a part hereof.

This invention is generally concerned with image processing systems, and more particularly with improved image processing systems employing so-called 'level-set' methods to describe moving interfaces. Embodiments of the invention have applications in two, three and higher dimensional modelling, and in particular in fitting a contour or surface to an image or an object.

It is known to employ implicit representations of shapes when processing images. These representations are described in more detail later but, broadly speaking, a shape (interface) in two or three dimensions is described implicitly in terms of a so-called 'level-set' function of spatial co-ordinates, the function being defined and the shape being implied by locations for which the function has some predetermined value, generally zero.

In this specification, we will refer to an interface, which in two dimensions comprises a curve and in three dimensions a surface and, in particular, a plurality of curved segments forming a closed curve or a plurality of surface segments forming a closed surface. Examples of interfaces include an outline or contour of an object in an image, such as a contour of a cell in a microscope image, a surface in a volumetric image (MRI, CT, ultrasound etc.) and a surface of an object in a scene viewed by a camera. In the embodiments we describe later, such an interface is represented by a zero level set, which has some redundancy for representing the non-zero levels. Advantageously, this redundancy may be addressed by imposing a so-called signed distance constraint, that prescribes an equal spacing of levels.

Such techniques are potentially powerful but when implemented in practice using numerical techniques, for example, by representing the level set function on a grid of pixels (here used generally to include voxels) and interpolating for intermediate locations, difficulties arise broadly speaking from the accumulation of small errors. This can be addressed by a process of re-initialisation but this complicates automatic implementation. Some other problems are outlined below.

Application of these techniques requires the use of differential operators, which cause problems known as shocks where a point lacks a unique nearest neighbour (for example, for a point at the centre of a radius of an arc). Furthermore, the information stored on grid locations corresponding to pixels/voxels does not generally provide a complete representation of the level set function, thus making it difficult to interpolate to off-grid locations. Such grid representations are also computationally intensive, although this can be addressed by updating only a narrow band of grid locations in the vicinity of the interface. However, where the interface moves to, in effect, an off-grid location outside this narrow band, it can be impractical to extrapolate outside the band from grid values within the band. Alternatively, widening the band may introduce a speed penalty which prohibits some applications such as real time tracking. Broadly speaking, the need for re-initialisation of itself suggests that the numerical technique leaves room for improvement.

For a description of the current state of the art reference may be made to the documents below. Amongst these the papers with the inventor as an author are hereby incorporated by reference:

[1] R. L. Carceroni and K. N. Kutulakos. Multi-view scene capture by surfel sampling: From video streams to non-rigid 3D motion, shape and reflectance. In *Proc. IEEE Int. Conf. on Computer Vision*, pages II: 60-67, 2001.
[2] L. D. Cohen. On active contour models and balloons. *Computer Vision, Graphics and Image Processing*, 53(2): 211-218, March 1991.
[3] H. Edelsbrunner. *Geometry and Topology for Mesh Generation*. Cambridge University Press, Cambridge, 2001.
[4] R. Goldenberg, R. Kimmel, E. Rivlin, and M. Rudzsky. Fast geodesic active contours. *IEEE Trans. Image Processing*, 10(10):1467-1475, October 2001.
[5] J. Gomes and O. D. Faugeras. Reconciling distance functions and level sets. *Journal of Visual Communication and Image Representation*, 11(2):209-223, June 2000.
[6] R. I. Hartley and A. Zisserman. *Multiple View Geometry in Computer Vision*. Cambridge University Press, Cambridge, 2000.
[7] C Johnson. *Numerical Solution of Partial Differential Equation by the Finite Element Method*. Cambridge University Press, 1987.
[8] N. Paragios. *Geodetic Active Regions and Level Set Methods: Contributions and Applications in Artificial Vision*. PhD thesis, INRIA Sophia Antipolis, France, January 2000.
[9] T. Preußer and M. Rumpf. A level set method for anisotropic geometric diffusion in 3D image processing. *SIAM J. on Applied Math.*, 62(5):1772-1793, 2002.
[10] G. Sapiro. *Geometric Partial Differential Equations and Image Processing*. Cambridge University Press, 2001.
[11] H. R. Schwarz. *Numerische Mathematik*. Teubner, Stuttgart, 1993.
[12] J. A. Sethian. *Level Set Methods*. Cambridge University Press, Cambridge, 1999.
[13] M. Weber, A. Blake, and R. Cipolla. Towards a complete dense geometric and photometric reconstruction under varying pose and illumination. *Proc. British Machine Vision Conference*, 1:83-92, 9 2002.
[14] M. Weber and R. Cipolla. A practical method for estimation of point light-sources. In *Proc. British Machine Vision Conference*, volume 2, pages 471-480, September 2001.
[15] J. Weickert, B. M. ter Haar Romeny, and M. A. Viergever. Efficient and reliable schemes for nonlinear diffusion filtering. *IEEE Trans. Image Processing*, 7(3):398-410, March 1998.
[16] O. C. Zienkiewicz and K. Morgan. *Finite Elements & Approximation*. John Wiley & Sons, NY, 1983.

There therefore exists a need for improved digital image processing techniques employing such level set function representations.

SUMMARY OF INVENTION

Broadly speaking in embodiments of the invention a boundary/interface for an object is determined from image data by iteratively converging an interface onto the object, starting with an interface which is, for example, the size of the image. This is done by moving the interface in a direction normal to the interface towards the object at a speed which is reduced as the object is approached.

The interface preferably is represented implicitly in terms of a level-set function. The update of the level-set function and in particular the speed of motion of the interface is determined using a cost function, which prescribes the motion of the interface. The cost function is dependent upon the desired interface motion and preferably also includes a cost that penalises deviations from the signed distance constraint which provides numerical stability. When the signed distance constraint is used, the update equation can be formulated in least-square form which minimises deviations from the desired interface motion and deviations for the signed distance property.

The particular form of the interface motion depends on the particular application. One important class of applications can be formulated as optimisation problem, in which case one can use for instance 'gradient descent' to derive the desired interface motion which will minimise the cost. For instance, the cost of this optimisation problem can be a density integrated over the interface. In some applications the density is derived from the image and is one way to express locally how the optimal interface should be positioned. In one application, a so-called Riemannian metric may be employed as density, which, broadly speaking, comprises a measure of an 'edginess' of an image, in one example decreasing from 1 in a uniform region to small values ($\approx 0$) at an edge. The image metric used may be chosen dependant upon details of implementation of the technique (some examples are given below). The technique described here applies to two, three and higher dimensional spaces and particular applications included are the detection of contours in 2D images and the detection of surfaces in 3D images (volumetric images).

Including an image-dependent value in the cost function allows the interface to converge in a desired fashion. For some applications we augment the interface structure with additional functions which we call material properties of the interface. For example, a reflectance function of an object (e.g. in parametric prescription) may be included as material property and included in the cost function. In this way, a 3D interface may be arranged to converge on a 3D boundary of a 3D object, viewed from one or more directions in only two dimensions. A single two-dimensional view may provide some 3D information, particularly when the light source and/or viewpoint positions are known and, optionally, light source and/or camera viewpoint data may be co-determined with the interface. Where more than one three dimensional view is available, the 3D model may be converged to fit data from both (or all) the views.

A second, related, aspect of embodiments of the invention relates to the form of representation of the level set function. The space in which the interface moves can be partitioned (into a simplicial complex) and dual form of representation is preferably employed, comprising a local representation and a global representation. The local representation comprises a representation in which portions or segments of the interface (e.g. curve or surface) each associated with a local level set function are represented by elements each having a plurality of nodes, values of the level set function being defined at these nodes. In this way, a substantially complete full functional form of a level set function may be associated with each element, thus allowing interpolation and/or extrapolation of the function to nearby points or regions. This allows a global representation in which only some of the elements, in particular those which contain the interface, are active. The level set function need only be evaluated on these active elements and these active elements need comprise no more than those needed to contain the interface—that is elements through which the interface does not pass need not be included when making numerical determinations of the level set function values on the elements. When the interface moves, this can be identified and then values for the level set function for a neighbouring element into which the interface has moved can be determined by extrapolation from values of the level set function on nodes of an element through which the interface previously passed. The active elements at any one time may be identified in a list or implicitly by giving nodes of inactive elements special values. Such a sparse representation facilitates more rapid computation of the desired interface motion. The position of an interface may be determined efficiently, in embodiments, by looking for a change in sign between two nodes of a single element, this resulting from the interface passing between those nodes.

In one embodiment an element comprises a simplex in the space of the image, that is in two dimensions (i.e. a triangle) for a two dimensional image or in three dimensions (i.e. a tetrahedron) for a three dimensional image produced, for example, by a three dimensional image capture device such as an object or body scanner, for example a MRI (Magnetic Resonance Imaging), X-ray tomography device (CT) or ultrasound device.

In one embodiment the space in which the interface moves (for example, rectangular for a two dimensional image or comprising a parallelepiped for three dimensions) is subdivided into a plurality of simplices which together comprise a simplicial complex. A single simplex in d dimensions is spanned by d+1 vertices and has d+1 sub-simplices of dimension d−1, each of which has d out of the d+1 original vertices. A simplicial complex is constructed by combining simplices according to rules, in particular specifying that the intersection of any two simplices from the complex is either empty or also a simplex (of lower dimension) of the simplicial complex. For example in two dimensions, if two simplices share an edge (i.e. 1-simplex) they must also share two vertices (i.e. 0-simplices). Examples of such partitions of space are detailed later.

Embodiments of the invention provide a number of advantages. The combination of the geometrical motion normal to the interface responsive to the image data with the signed distance constraint in effect removes the redundancy of the implicit representation and provides numerical stability. Furthermore providing a complete functional representation of a level set function polynomial using nodes on an element, in particular a simplex, allows determination of the function within the element without the need for a separate interpolation prescription and facilitates accurate extrapolation which, in turn, facilitates a sparse representation globally of the level-set function.

As will be seen later in embodiments, a substantially complete determination of the level-set function may be determined by minimising a cost function in which the speed of motion of the interface is dependant upon the image data. This may be evaluated by means of an indirect test for the value of the speed of motion, broadly speaking by integrating the product of the speed with an arbitrary test function, since this integration only gives zero if the speed is zero (this type of formulation is commonly termed a weak formulation). Preferably, values of the level set function are represented using a linear combination of nodal basis functions in order to facilitate a calculation of cost minimisation in order to move the interface.

In the case of a number of 2D images of a three dimensional object, each pixel of an image captured by, for example a digital image capture device, corresponds to a ray from the camera to the object and each of the corresponding visible locations on the 3D object can be at different depths (distance from the camera). The estimation of shape and, in one embodiment of the method also reflectance, can be based on the intensity and colour distribution captured by the imaging device as we will describe below.

Broadly speaking, embodiments of the method enable convergence of the interface to a desired degree in a time $\mathcal{O}(A)$ for a two dimensional case, where A denotes the area (in pixel units) of interest in the image in two dimensions, and in time $\mathcal{O}(V)$ in three dimensions where V denotes the volume (in voxel units) of the area of interest.

According to a first aspect of the present invention there is therefore provided [as claim 1]. The invention also provides [as claim 3].

The method can be used in a variety of applications to represent and estimate curves, surfaces and higher dimensional objects (so called interfaces). In one embodiment of the method the description of the interface contains a map (here called material properties) which can be used to represent and estimate additional physical and non-physical properties of the interface such as for instance the reflection of light. In one embodiment, the estimation of the interface is performed as a so called interface evolution. Evolution refers here to the process of deforming iteratively an initial interface so that it is adjusted in a desirable way. For instance, one can prescribe an evolution by demanding the local minimisation of a certain, application dependant cost. As an example, such a cost can comprise an integral of a density over the interface. What is later termed density (because it is integrated over, see density $\gamma$ in equations (15) and (16)—it does not generally represent a physical density). Among others, the density can have location, orientation and material properties as arguments. The interface and boundary data at any stage of the evolution may be stored or output for subsequent processing.

To determine a two dimensional contour of an object, the image metric may comprise a Riemannian measure of distance (see equations (52), (54) and (15) below). Alternatively, one can employ more general forms of densities like for example the type of density in equation (28) termed later quadratic density. Preferably the motion is represented using a level set since this facilitates update of the level set function representing the interface. For example, in one embodiment this is merely a question of adding values at element nodes for the motion to values for the interface.

In a contour-determining embodiment, the combined cost function preferably comprises a substantially affine function of the motion (see equations (8) (10) and (11) later, preferably with coefficients which are substantially linearly dependant upon the image metric or density (see equations (40) or (32) and (33)).

The above described method can also be used to find an inner (nested) boundary. For example, where an image metric or density (for example as equation (54) or (55)) is employed which reduces as a boundary is approached, the method can be run once to determine an outer boundary, and then the metric changed so that the interface moves away from the boundary inwards (for example in equation (54) substituting 1-g for g), re-running the method to start the interface moving inwards and then reverting to the first image metric (g) to find the next inner boundary.

Once boundary data has been determined, a variant of the method may be employed to, in effect, map a signed distance function for the determined boundary. Thus the method can be operated with a substantially constant motion of the interface to determine signed distance function data over part or all of the grid of elements (simplices).

The method may also be employed to determine visual hull data for a three dimensional object and by capturing a plurality of two dimensional views of the object from different angles and, for each view, determining a boundary of the object. Then a cone is projected from each of the viewpoints towards the object, the intersection of these cones then defining the visual hull. Here a visual hull describes a shape or boundary which encloses an object, and is preferably polygonal. It will also be appreciated that such a visual hull will generally lack concave areas.

The above described method can be used in a similar fashion to detect boundaries and interfaces in higher dimensional images. Examples of such higher dimensional images are given by so called volumetric images such as MRI, CT or 3D ultrasound images. Similarly to the 2D application involving contours, one can proceed by

- computing an edge detector function expressing local features of the image (e.g. using intensity gradient magnitudes);
- the definition of a image induced metric or (for instance quadratic) density;
- the specification of an initial interface (e.g. the boundary of the computational domain);
- ab interface evolution converging the interface to the desired shape;
- where desirable, repetitive application of a modified evolution to capture nested structures;
- the output and/or storage of the interface of it as the desired boundary (or sections of the interface).

For the reconstruction of the shape and reflectance of a 3D object/scene from 2D images, the visual hull (e.g. obtained by contour detection as above) can be used as initial shape estimate as described in [13] which is hereby incorporated as by reference. Broadly speaking such a method constructs a visual hull and then carves this out by removing voxels according to a carving criteria (for example equation 4.1 in the referenced paper [13]). Optionally a segmentation consistency constraint may also be applied for objects that contain edges or corners where the surface orientation is not well-defined, which can cause photometric inconsistencies.

In a preferred embodiment of the method the cost function includes a reflectance cost such as a cost based upon a parametric reflectance model (e.g. Lambertian reflectance) or, for objects having a generally specular reflectance characteristic, a combination of more general parametric reflectance models such as the inclusion of a Torrance-Sparrow model may be employed. In this way, an interface in three dimensions defining an approximation to a boundary of a three dimensional object (i.e. a surface) may be converged using data from one but preferably a plurality of two dimensional images. Preferably, the numerical description of the object includes parameters for the reflectance function which is allowed to vary over the interface. Preferably therefore the determined boundary data in this case includes reflection data, although this data need not be evolved using a level set function such as is used for evolving the interface. In this way the interface converges to provide maximum agreement with the observed image intensities.

It will be appreciated that the reflectance cost may comprise a measure of colour, that is it may be dependent upon wavelength. In preferred embodiments, the reflectance parameters are represented using a finite element-type representation, preferably employing at least a subset of the same grid of nodes as used for the level set representation(s) although an implicit level set representation is not needed for these parameters.

In more detail, in order to model the intensities (irradiance values) observed in the images, one can complete the purely geometric model by a reflectance function. The varying parameters of the reflectance function can be represented as material properties on the interface. We can then formulate an optimisation problem (see (59) and (67)) with the objective to achieve agreement with the observed image data. For instance, one component of the cost can comprise a photometric consistency criteria. More specifically, the cost can comprise terms measuring the difference between the colours and intensities predicted by the interface and its reflectance properties on one hand and the colours and intensities that were captured in the images. Starting e.g. with the visual hull, we aim to minimise the cost by evolving the interface in terms of shape and reflectance. In particular, with known illumination, camera position and assumed (preliminary) interface and reflectance data, one can in each image of the scene predict the colour and intensity of every pixel that corresponds to a part of the object as in equation (68) or (69). Importantly, the representation of the above method includes the prediction of which areas of the object are expected to be visible or not visible i.e. occluded for a particular camera and also which of the light-sources are illuminating a particular area or not (i.e. area is in shade).

Preferably, as mentioned above, a form of representation and data structure is adopted in which the image is subdivided into a plurality of elements (that is the image space not merely the portion of the image represented by the object), preferably simplices, each having a plurality of nodes sufficient for a substantially complete local representation of the level set function. Thus the level set may be determined locally at these nodes and, if desired, these values may then be used to evaluate the level set function at other positions within an element. More particularly, however, the values of the level set function of the nodes may then be used to extrapolate to nearby elements since the level set function is substantially completely locally defined by the node values. This in turn allows a global representation in which only those elements which contain the interface, that is through which the interface passes, are used when calculating the level set function.

Thus the invention also provides [as claim 16]
The invention further provides [as claim 20]
The invention further provides [as claim 21]
In a further aspect the invention provides [as claim 22]
The invention also provides [as claim 23]
The invention further provides computer program code to implement the above described methods, computer apparatus programmed to implement the methods, and the processor control code of the above described systems.

The code may be provided on any convenient carrier such as a hard or floppy disk, ROM or CD-ROM or on an optical or electrical signal carrier, for example via the Internet or another computer communications network. Any conventional programming language may be employed, for example, a high level language such as C or lower level assembly language or machine code. Thus the code may comprise source, object or executable code. As the skilled person will appreciate the code may be distributed across a plurality of coupled components, for example across a computer network.

Embodiments of the above described methods may be implemented on a general purpose computer system such as a PC or MAC.

The advanced method has applications including:

Automatic and unsupervised detection of contours in 2D images. Relevant examples are biological/medical research with the need of large scale quality analysis of microscopic images.

Tracking of general object in video sequences. Due to the speed and stability it becomes feasible to replace simple trackers (e.g. using a rectangle to track) by contour trackers. With the novel idea, generic contour tracking without a-priori model is possible.

Automated construction of the visual hull and 3D models of objects from 2D images. Application of the novel idea results in the complete knowledge of contours in the images whose re-projections can be used together with camera calibration data to construct a 3D outline of the object (e.g as polygon).

3D version of the idea can be used to segment 3D image data (available e.g. in some medical imaging techniques). The new idea results in a stable, unsupervised and fast detection of structural boundaries (e.g. organs, blood vessels etc.)

Modelling of interfaces in Material sciences, Fluid Mechanics, Computational Geometry and Computer Vision. General advanced tool for modelling the transition between materials with applications in process control, product control and repair of parts by visualising the deviations from CAD data (e.g. welding industry). Further applications are in dentistry.

Reconstruction of dense geometric and photometric 3D models from digital images. The novel idea allows one to represent and estimate geometric and photometric quantities in an advanced way. Application areas are www-advertisements, virtual museums, supply to model libraries, computer games, movie industry. Future applications are also in the mobile phone industry (camera integrated phones) and in robotics (including space exploration).

Stated below are the principal implementation steps of the proposed method in a 2D and a 3D example.

Contour Detection as a 2D problem:

Generation on an image-edge metric or density: The image is smoothed and an edge detector function g is computed that reflects the local probability of an edge location ($g=1$ in the absence of an edge and $g \approx 0$ at the location of an edge). Several different detector functions exist for a variety of applications that are sensitive to intensity edges, colour edges etc. The metric is then represented as finite element functional (of fixed polynomial degree and with Lagrangian elements) over the image domain.

The level-set function u is represented as sparse finite element functional (of the same fixed polynomial degree as the metric). It is initialised in a way that the interface (i.e. its zero level-set) is a rectangle the size of the image and its gradients are of unit length (signed distance constraint).

Iteratively, the level-set function is updated. The overall update consists of two steps: a local and a global step.

local update: the update of the functional is performed as solution to an optimisation problem (least-square problem) that is posed using a Petrov-Galekin construction. It is optimised is for the differential change of the finite element functional that preserves the signed distance constraint and that moves the zero level-set in an application prescribed way. The application generally prescribes the magnitude of the normal speed of the interface. For the contour detection problem, this is the geodesic contour motion equation which is newly implemented in a weak sense using Greens formula to allow for the correct, regularised formulation.

global update: the motion of the interface can cross the boundary of the minimal set of elements used to represent it. When this happens the simplicial complex needs to be adjusted: Elements are created using extrapolation from existing elements. Furthermore, elements that do not any longer contain a part of the interface are removed from the representation to ensure the minimal property of the representation.

Convergence leads to the detection of the outer-most closed contour in the image.

It newly proposed to run the same evolution with the metric $\bar{g} := 1-g$ and use the converged result as initialisation of another evolution using g as metric. This alternation produces nested contours contained in the image and terminates after a finite number of alternations when no further inner contour exists (interface collapses).

Construction of Dense Geometric and Photometric 3D Models:

Acquisition of a number of images corresponding to different views and illumination.

Calibration of light sources (standard see, for example, [14]) and optionally camera parameters from a calibration object or directly from the scene (methods to calibrate from the scene are in preparation and use contour information as well as the advanced dense information provided by the novel representation).

Contour detection for the input images using the above method and automatic construction of a visual hull as a polygon (see [13] above).

Initialisation of the 3D model. Geometry is initialised by the proposed 3D interface prescription of the visual hull. Photometric data (reflectance function) is estimated as best-fit (least square) given the geometry. For that purpose, intensity information corresponding to a given pixel in an input image is re-projected onto the current model estimate (ray-intersection) and results in a contribution to the Euler-Lagrange equations.

Iterative refinement of the model is done by updating the geometry and reflectance simultaneously. This is done by driving the interface and reflectance evolution by a photometric consistency constraint posed in [13] above Optionally shadows and occlusion are computed and used as constraints and constitute additional constraints incorporated into the update of the model.

As additional step, the light source and camera parameters are updated using Euler-Lagrange equations corresponding to the variation of the finite number of parameters describing point light-sources and cameras.

The iterative process is terminated when the model has converged to predict all input images. The resulting model can be exported into standard graphics formats (e.g. VRML).

The method can be extended to model scenes which change in time and are captured by synchronised multiple view video. Construction of the initial model (first frame) is identical to the described static case while the model estimation of following frames is aided by the previous model and a dynamic model of how the object moves or is deformed (Kalman Filter).

We use the term image in a broad sense, specified later, to include images over more that two-dimensional spaces (e.g. volumetric images) and images with irregular distributions of pixels/voxels.

These and other aspects of the present invention will now be further described, by way of example only, with reference to the accompanying figures in which:

LIST OF FIGURES

FIG. 1 shows that the finite element approach has better stability. The figure shows (a) an initial level-set and compares three different geodesic contour implementations in d=2 dimensions: (b) Hamilton-Jacobi evolution, (c) grid signed distance evolution and (d) sparse finite element evolution FIG. 2 shows the superior accuracy of the new numerical scheme. The diagram quantifies deviations of the detected interface from the unit disc for various grid-resolutions.

Figure 1:
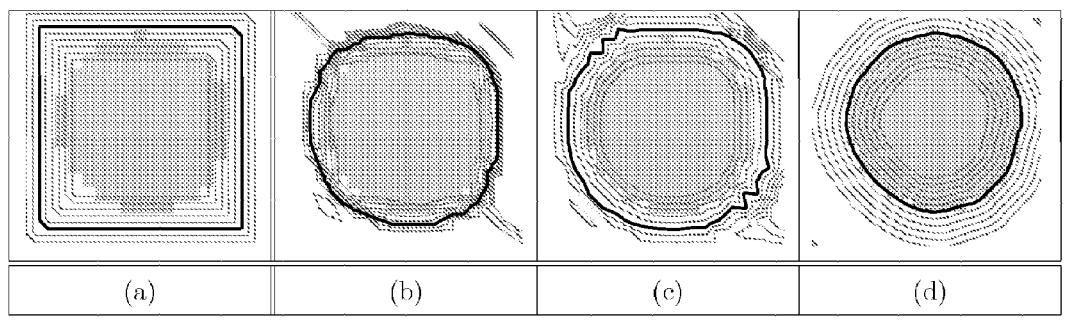

In what follows, references to documents listed in the introduction are indicated in square brackets. We adopt the following terms:

Image: A digital data set that holds values for certain positions in space. If the positions in space follow a regular/periodic pattern, we refer to them a pixels in 2D or voxels in 3D. Images on higher dimensional spaces are also possible and included in the present invention. The values assigned to each position are different for various types of images: they can correspond to brightness, to colour or other physical and non-physical properties described by the image.

Interface: A (d−1)-dimensional subset of d-dimensional space that assigns to each point in d-dimensional space a binary label (called outside or inside of Γ). The set of inside locations (likewise outside locations) can comprise several non-connected regions. A single interface can comprise several non-connected components. In 2D an interface is a closed curve which can comprise several components. In 3D an interface is a closed surface which can comprise several components.

Material Properties: We use the term material properties for functions on the interface. These properties can be used to describe or parametrise physical processes on the interface, such as the radiation/scattering of light. Examples for the values of such functions are: brightness, colour values or reflectance.

Cost: A term used for the objective function in optimisation problems that are formulated such that the objective is to minimise the objective function.

Density: Usually denoted by γ. Local function on the interface that determines the overall cost function in the case where the cost is an integral over the interface.

Visual Hull: Area in 3D obtained as intersection of contour-cones. By the projective nature of a camera, each contour in an image re-projects to a cone which is centred at the optical centre of the camera and whose intersection with the image plane agrees with the contour in the image.

We use the following mathematical notation (in addition to standard notation):

$\forall x$ for all x $\exists x$ exists x $A^T$, $v^T$ denote the transpose of matrix A and vector v respectively.

$v \otimes w$ for vectors v, $w \in \mathbb{R}^d$ is defined as $v^T w$ $\langle v, w \rangle$ denotes the standard scalar product of vectors v and w: $\langle v, w \rangle = v^T w$.

$\langle v, w \rangle_A$ denotes the product of the vectors v and w and a matrix A: $\langle v, w \rangle_A = v^{TAw}$.

x :=y denotes the definition of x by y.

$\int_X f \, d\mu$ denotes Lebesgue integration of the function f over the set X.

$\alpha \wedge \beta$ denotes the skew wedge product between differential forms α and β.

dω denotes the exterior derivative of the differential form ω

$$\frac{df}{dx_i}$$

differentiation of f with respect to $x_i$ $$\frac{\delta f}{\delta \phi}$$

variational derivative of f with respect to the function φ

$$\frac{\partial f}{\partial x_i}$$

partial differentiation of f with respect to $x_i$ $\nabla f$ gradient of f $\nabla_x f$ gradient of f with respect to the vector component x only, where f(x, y, ...).

div v divergence of the vector field v $\chi_M$ characteristic function of set M ($\chi_M(x)=1$ if $x \in M$, otherwise $\chi_M(x)=0$).

$\mathcal{O}(f)$ computational complexity proportional to f.

We also use the following conventions in the description of various numerical algorithms (in addition to standard conventions):

NAME(X) marks the beginning of the procedure NAME with argument(s) X as input.

return Y exits present procedure and returns value Y

{TEXT} comment (i.e. explaining TEXT) to clarify procedural details

General Sparse Finite Element Level-Set Method

We now describe Level-Set Methods: In more detail, level-set methods are generally useful for the analysis of image data in 2D (two dimensions), 3D (three dimensions) and higher dimensions, when one has to move an interface Γ, for instance with the objective of minimising a cost functional C which depends on Γ. In this document, we will present a novel numerical scheme to move interfaces in a d-dimensional Euclidean space. The particular form of the speed of the interface in normal direction β depends on the application (for instance, if a cost C is specified, one can use choose the variational derivative to perform gradient descent on the cost). We introduce an efficient representation and detail a numerical scheme which moves the interface in an efficient, accurate and stable way.

Level set-methods [12] introduce a level-set function (φ is a continuous, real valued function) φ to represent the interface Γ implicitly as the zero level-set: $\Gamma := \phi^{-1}(0)$. The implicit representation links φ (as the introduced analytic entity) with the geometric entity Γ: $\phi \mapsto \Gamma(\phi)$ and allows for changes in the topology during the evolution. Furthermore, it was pointed out that this relationship can be made one-to-one by imposing the signed distance constraint. The conceptual advantage is then that φ is (up to a sign) uniquely determined by Γ and that one can also write $\Gamma \mapsto \phi(\Gamma)$. In this way φ gets the intrinsic geometric meaning as the distance function for Γ.

We now describe differential minimisation and level-set evolution: For the evolution, one introduces an evolution parameter $t \in \mathbb{R}$ and φ becomes time dependent (One refers to the parameter t as time although it is not related to physical time.). One starts with an initial function φ(0,.) and prescribes an evolution φ(t,.) that tends towards local minima of the cost C using gradient descent. In the level-set formulation, the gradient descent is expressed in the evolution equation, a partial differential equation (PDE):

$$\frac{d\phi}{dt} = \beta \qquad (1)$$

where, at the interface Γ, β is the differential of the cost $\left(\frac{\delta}{\delta \phi}\right.$ denotes variational differentiation$\left.\right)$.

Therefore, $\beta|_\Gamma$ is prescribed by the application $$\left(e.g. \ \beta|_\Gamma := -\frac{\delta C}{\delta \phi}\right)$$

while it is defined globally as in to maintain the signed distance constraint. The signed distance constraint is well known for its desirable conceptual and numerical properties [5]. Where φ is differentiable, we have $|\nabla \phi(x)|=1$ and, for $x \in \Gamma$, one has particularly simple expressions for the normal $N(x) = \nabla \phi(x) \in S^{d-1}$ and mean curvature $\kappa(x) = \Delta \phi(x) \in \mathbb{R}$ along Γ.

We now describe Previous numerical problems of evolving level-sets: In the following, u denotes the numerical representation of the level-set function φ. There are two major issues in the numerical implementation of the PDE (1): one is efficiency and the other is stability. Potential inefficiency arises from the need to maintain an entire function u with arguments in $\mathbb{R}^d$, in order simply to obtain the interface Γ. "Banded" schemes have been suggested [12, 4, 8] which restrict computations to the immediate neighborhood of Γ. Because the interface Γ can leave the band, those schemes require an the algorithm to extend the sparse representation u as signed distance map. However, the extension outside the current band is only consistent if the signed distance property is preserved by the evolution in the prior art techniques.

The implementation of the evolution (1) on a grid of pixels/voxels in finite difference schemes results in a stability problem, illustrated by the bunching of levels in FIG. 1.

Although the signed distance constraint used by Gomes and Faugeras [5] maintains the equal spacing of levels in principle, the numerical implementation (discretisation and finite numerical accuracy) still causes a drift which eventually destroys the equal spacing. The bunching of levels destabilises the evolution and affects the convergence. Therefore, previous methods required a separate re-initialisation procedure in order to restore the signed distance property. One also needs to select a suitable frequency for invoking the re-initialisation procedure to maintain stability of the evolution without sacrificing the speed of the algorithm severely.

Sparse Zero Level-Set Representation

We now describe the sparse finite element approach: We address the problems of efficiency and stability by proposing a novel scheme that uses finite elements [16, 7] to represent and FIG. 1: This figure shows that the finite element approach has better stability. The figure compares three different geodesic contour implementations in d=2 dimensions. The initial shape is a square (18×18 pixels) and the target shape is a discrete circle (shaded pixels). The zero-level is indicated as a dark line in each case and neighbouring levels are drawn with a level spacing of 0.5 pixel units. (a) initialisation by a rectangle. The following images display the propagation of the level sets when a time step of $\Delta t=0.1$ is used to evolve the level-set function to t=20. (b) The Hamilton-Jacobi evolution [12] causes a bunching of levels which destabilises the evolution and requires a separate re-initialisation procedure. (b) The signed distance evolution [5] in grid representation improves the stability but still has a slow drift from the signed distance property which also requires a re-initialisation procedure. (c) Novel sparse finite element evolution maintains the signed distance constraint indefinitely, with no need for re-initialisation.

Evolve u:

The band is represented as a simplicial complex, over which simplices are continually added and deleted, in a fashion which is integrated and harmonious with the differential evolution of u. No mode switching is required to deal with the interface Γ falling out of the band.

The simplicial representation (representation involving a complex that consists of simplices) of the band allows it to have minimal width, resulting in enhanced efficiency. Derivatives are treated by our weak formulation with no need for conditional operators. As a consequence, no second order derivatives of the level-set function have to be computed explicitly.

With finite elements, the function u is defined everywhere, not just at grid locations, and sub-grid accuracy is particularly straightforward.

The signed distance constraint is maintained in a stable, convergent fashion, even over indefinite periods of time. This results in an algorithm which is demonstrably more stable (FIG. 1) and more accurate (FIG. 2) than previous approaches [12, 5].

Figure 2:
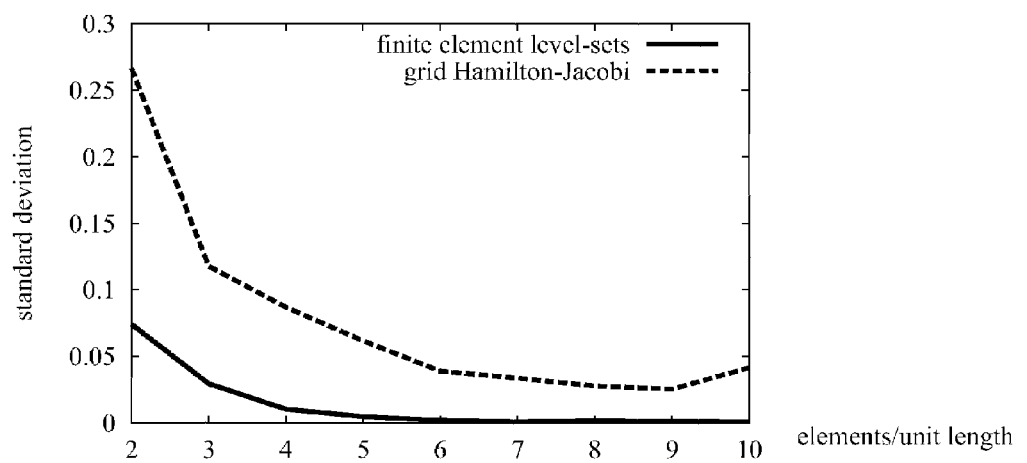

FIG. 2: shows the superior accuracy of the new numerical scheme. The diagram shows deviations of the detected interface from the unit disc. The unit disc is used as target shape of the geodesic evolution (see FIG. 1). The diagram shows the deviations (vertical-axis) between the result of the level-set evolution and the target shape when the pixel resolution is varied (horizontal-axis). The lines in the diagram correspond to the Hamilton-Jacobi scheme and the novel method presented in this paper. The new method clearly performs better. The increase in deviation for the grid method on the right is caused by numerical instabilities that occur when no re-initialisation is used.

We now describe the efficient representation with 'banded' finite elements:

The new numerical representation u comprises a global and a local component:

The local component inside each element is a polynomial in d variables which pre-scribes the location of the zero level-set inside the element.

Figure 5:
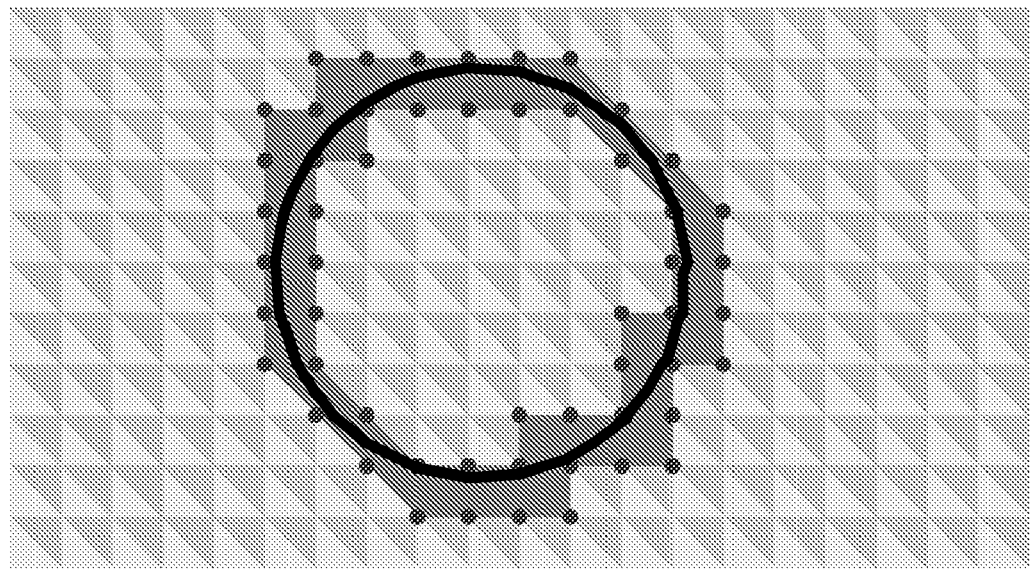
FIG. 5 illustrates the partitioning of 2D space $\mathcal{M}$ and gives an example of a sparse finite element representation $\mathcal{A}_v$, u of an approximate circle.

The global component, the 'band', is a simplicial complex A that consists of the minimal set of elements that contain the zero level-set (FIG. 5). We refer to elements that are members of the complex as being active. The representation differs from standard finite element representations in that the complex is sparse and in that it changes dynamically.

We now describe the use of finite elements for the local representation: Following standard methods found in finite element methods [16, 7], we use a d-simplex T to represent u locally as a polynomial of fixed degree p in d dimensions. For instance, the standard simplex $T_0^d$ is defined to be the convex hull of the standard Euclidean basis vectors $b_1, b_2, \ldots, b_d \in \mathbb{R}^d$ and the origin $b_0=0$. In d=2 dimensions, the standard simplex is simply a triangle as in FIG. 3. In d=3 dimensions, each element is a tetrahedron (see FIG. 4).

Figure 3:
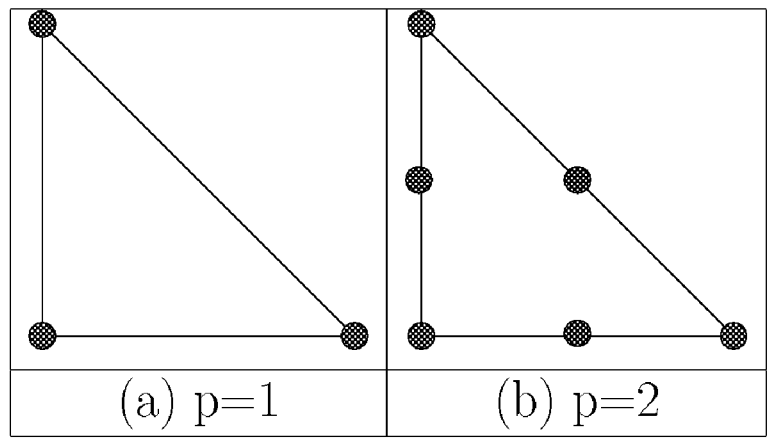
FIG. 3 shows a standard finite element in 2D (a triangle). Indicated (circles) are also the locations of nodes inside a simplex for (a) the first order element case (p=1) and (b) the second order element case (p=2).

FIG. 3: Triangle (2-simplex)—Finite Element in 2D: The figure shows in particular locations of the nodes inside a simplex for (a) the first order element case (p=1) and (b) the second order element case (p=2).

Figure 4:
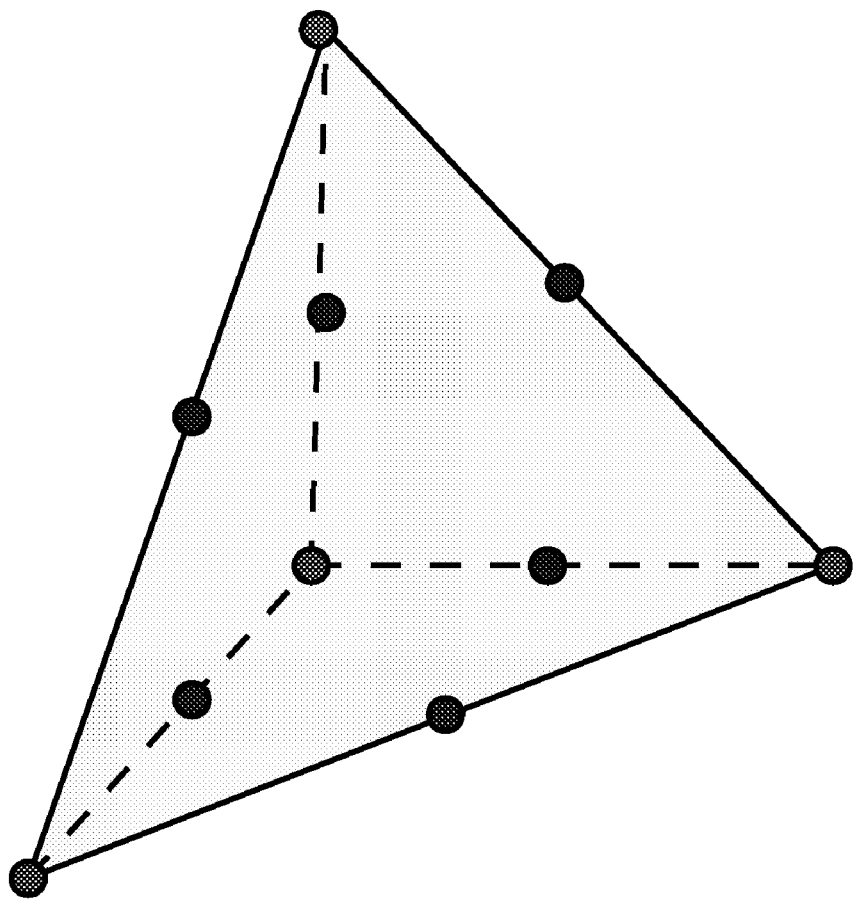
FIG. 4 shows a finite element in 3D (a tetrahedron, not necessarily of this particular shape). Indicated (circles) are also the position of nodes for 1st and 2nd order elements.

FIG. 4: Tetrahedron (3-simplex)—Finite Element in 3D: The figure shows a tetrahedron (not necessarily of this particular shape) which is the elementary building block of our level-set representation in 3D. Indicated are also the position of nodes for 1st and 2nd order elements: the 4 nodes of 1st order elements are the 4 vertices. In the case of 2nd order elements there are 6 additional nodes located in the middle of each edge, as indicated.

We adopt the following terminology from finite element methods [16, 7]:

a node is a location $x_i \in T$ together with a real value. We position the nodes on the grid $1/p \ \mathbb{Z}^d$ as indicated in FIG. 5 for the 2D case and FIG. 4 for the 3D case (where we have used the coordinate system of the standard simplex).

the nodal basis function $e_i$ associated with node i is the unique [16] polynomial of degree p that evaluates at the nodes to: $\forall j \ e_i(x_j)=\delta_{ij}$ where $x_j$ is the position of node j.

u is a linear combination of the nodal basis functions: $u=\Sigma_j u_j e_j$.

Note that the fact that the integral over u is a linear map allows us to integrate efficiently by using linear combinations of pre-computed integrals over (products of) basis functions.

We now describe how to obtain an efficient global representation:

To obtain a global representation, we partition $\mathcal{M}$ the d-dimensional space into simplices (also called mesh). FIG. 5 illustrates a possible partition in the 2D case and illustrates the sparse representation using an approximate circle as example of an interface.

FIG. 5: Sparse global representation (2D): The image illustrates the decomposition of space into a simplicial complex $\mathcal{M}$; the plane is partitioned into standard simplices (triangles, shaded lightly). As an example, the sparse representation of a level-set function with an approximate circle as zero level-set is displayed. Efficiently, computations are restricted to the active complex $\mathcal{A}$ (shaded darker) which consists of the minimal set of elements that contain the interface.

Below we give concrete examples of such partitions in 2D and 3D. The method does not require a particular choice of partition but requires the partition to be a simplicial complex.

The dynamically changing subset of active simplices $\mathcal{A}$ is a subset of the partition $\mathcal{A}$: $\mathcal{M} \subset \mathcal{M}$.

Our global representation of the functional u consists of the active complex $\mathcal{A}$ covering the area $\Omega$. Each d—simplex of the complex is mapped to a finite element and defines in this way a global functional u on the area $\Omega$. By the sharing of nodes, we obtain a global functional that is automatically continuous (This is a significant advantage over representations that do not enforce continuity (like for instance the surfel representation used in [1])). In 2D, a rectangular area (e.g. the image plane) can be partitioned using standard simplices as illustrated in FIG. 5.

We now describe Stable dynamics to evolve the novel representation: Having defined the efficient numerical representation of u, we now show how a stable evolution can be defined which is at the heart of our method. In order to avoid re-initialisation procedures, we integrate the signed distance property into the evolution equations by introducing an error functional r which penalises deviations from the desired interface motion $\beta|_\Gamma$ as well as deviations from the signed distance property. The evolution algorithm then minimises this functional.

Signed Distance Constraint and Level-Set Evolution

We now describe components of the evolution equations: Firstly, unlike [5], we express the signed distance constraint in the following form:

$$(\nabla_x u)^2 - 1 = 0 \tag{2}$$

Secondly, the desire to move the interface at a normal speed $\beta|_\Gamma$ simply implies $$u_t|_\Gamma = \beta_\Gamma \tag{3}$$

for the update of u by (1). We consider interface motion of the general form [12]

$$\beta|_\Gamma(t, x, N, \kappa) \tag{4}$$

which involves external forces by the dependence on $x \in \mathbb{R}^d$ and $t \in \mathbb{R}$ as well as the intrinsic quantities orientation N and curvature $\kappa$. Note that this means that $\beta|_\Gamma$ depends on the $2^{nd}$ derivative of u and that we have $\beta|_\Gamma(t,x,N,\kappa) = \beta|_\Gamma(t,x,\nabla u, \Delta u)$ due to the signed distance constraint. In particular, we detail below the case where $\beta|_\Gamma$ derives as gradient descent of a cost functional C.

We now describe discrete dynamics of the system: Now the evolution of the level-set function is set-up in discrete space and time, in terms of the displacement v of the function u over a time-step $\Delta t$:

$$u(t+\Delta t, .) = u(t, .) + v(t, .). \tag{5}$$

Here v is represented over the finite element basis, in the same way as u is, and represents displacement for a time $\Delta t$ velocity $\beta$:

$$v = \Delta t \beta \tag{6}$$

where one can choose to evaluate $\beta$ at u to define an explicit scheme (i.e. $v = \Delta t \beta(u)$) or to evaluate $\beta$ at u+v to define an implicit scheme (i.e. $v = \Delta t \beta(u+v)$) [15] which does not limit the magnitude of $\Delta t$.

We now describe a weak formulation of evolution dynamics: Inspired by the Petrov-Galekin formulation [16, 7] used in finite element methods, we employ a weak formulation of (2) and (3). Using a weak formulation has several advantages:

It allows us to measure and use the constraint equations for the entire active area $\Omega$, and not just at discrete, sampled locations [5].

It allows for curvature dependent interface motion (4) even in the case of first order elements (p=1) by the use of Green's theorem.

It gives an appropriate regularisation of derivative operators without the need of switch-operators found in grid representations [12, 5].

In the Petrov-Galekin form, one uses the nodal basis functions $e_i$, $i \in \{1, \ldots, n\}$ as test functions to measure deviations from the desired evolution properties (2) and (3). First, the signed distance equation (2) becomes a set of equations:

$$z_1^i = 0, \text{ for } i = 1, \ldots, n \tag{7}$$

where $$z_1^i := \int_\Omega ((\nabla u + \nabla v)^2 - 1) e_i. \tag{8}$$

Secondly, the velocity law (6) is expressed as $$z_2^i = 0, \text{ for } i = 1, \ldots, n \tag{9}$$

where $$z_2^i := \int_\Omega (v - \Delta t \beta) e_i. \tag{10}$$

We now introduce an optimisation problem to determine the update of the level-set function which minimises deviations from (7) and (9) (the optimisation problem introduced here is not to be confused with the optimisation problem (15) introduced later as an example of an objective function that gives rise to the differential evolution $\beta|_\Gamma$ in the first place).

We now describe level-set update equations as optimisation problem: The two sets of equations (8) and (10) represent an overdetermined system of 2n equations in n unknowns. We measure the deviations in the following functional:

$$r^2 := |z_1|^2 + \alpha^2 |z_2|^2, \tag{11}$$

where $$z_1 = (z_1^1, \ldots, z_1^n)^\top$$

and similarly for $z_2$, and $\alpha \in \mathbb{R}_+$ is an arbitrary positive constant that balances the competing terms in the optimisation problem.

The functional can be written compactly by expressing $z_1^i$ and $z_2^i$ in terms of the node values $v = (v_1, \ldots, v_n)^T$ for the displacement v, and similarly for u:

$$z_1^i = u^\top Q^i u - k^i + 2 u^\top Q^i v + h_i(v) \tag{12}$$

$$z_2^i = P^i v - \Delta t \int_\Omega e_i \beta \tag{13}$$

where $h_i(v) := v^T Q^i v$ and where constants k, P, Q are defined as:

$$k^i := \int_\Omega e_i, \quad P_{ab} := \int_\Omega e_a e_b, \quad Q_{ab}^i := \int_\Omega \langle \nabla e_a, \nabla e_b \rangle e_i \tag{14}$$

The quantities (k, P, Q) can be pre-computed analytically, and stored as constants. In fact, the integrals can be performed element-wise (summing over all elements active T that constitute $\Omega = \cup_{T \in \mathcal{A}} T$ as we will detail in the description of element integral computations derived later. Note that the deviation $z_1$ is almost affine in the unknown speed v since the $h_i(v)$ are small, provided u approximates the signed distance property and if the time step $\Delta t$ is sufficiently small. In that case (12) can be linearised, ignoring h, by replacing $z_1$ by $$\tilde{z}_1^i = u^\top Q^i u - k^i + 2u^\top Q^i v.$$

We solve the linear least-square problem numerically by using the conjugate gradient method [11]. We exploit the sparsity over the computational grid which allows the linear simultaneous equations to be expressed in banded form over the nodal basis. Using the banded form, we solve for v in $\mathcal{O}(n)$ where n denotes the number of nodes and is proportional to the size of the interface in element units.

We now describe how the global evolution ensures the containing property: For our method we aim to detect changes in the active complex $\mathcal{A}$ efficiently. The new method is outlined in the numerical algorithm, Algorithm 1 below. After each local evolution (lines 2-4 of evolve), we adjust the active complex by adding and removing elements (lines 5-14 of evolve) to ensure that it contains the current interface $\Gamma$ and that it is minimal with that property. The initialisation of neighbouring elements is well defined; this is the case because although we restrict the numerical representation to the sparse complex, u is indeed defined globally by the signed distance constraint. This justifies the use of the extrapolation procedure in the activate procedure. Extrapolation is natural since, unlike in grid representations, u is represented in full functional form and does not require any separate interpolation mechanism for evaluation.

The maintenance of $\mathcal{A}$ (activation and removal of elements) is performed efficiently in evolve by looking at the (d−1)-simplices of the complex. Note that the level-set function along a (d−1)-simplex S is a polynomial of degree p which is determined by the values of the nodes contained in S.

The activity of S (i.e. if S∈A after an update of u) can be determined recursively as follows:
  if S is a 1-simplex it is active if and only if it contains the interface (i.e. if the implied polynomial contains a root within S). To decide about the roots is particularly straightforward for p≦2.
  if S is a n-simplex with n>1, then it is active if and only if any of its n+1 (n−1)-simplices is active.

In particular for 1st order elements the decision whether a simplex S is active reduces to the checking of the signs that the updated u takes at the nodes.

For instance, one can use the above numerical algorithm to detect a class of interfaces that are defined as local minima of a costing function C. An example of such a numerical algorithm is displayed as Algorithm 2.

We now describe level-set evolution, firstly interface motion and signed distance constraint: In what follows, we will usually assume that the level-set function is preserved as the signed distance to the interface (e.g. with the introduced active signed distance restoring mechanism). However, we would like to point out that one can apply the following results also to the case where the signed distance is not or only very roughly preserved. Generally the signed distance constraint stabilises the evolution but for time-critical applications it might be advantageous not to impose the constraint (or to restore it only occasionally using re-initialisation). In order to ensure an unchanged motion of the implicit interface $\Gamma(u)$ when the level-set function u is scaled: u→su with s ∈ $R_+$ all we have to do is to ensure that also β→sβ. Where the interface speed is in the general case $$\dot{x} = -\frac{\beta(u)}{|\nabla u|} N.$$

---

Algorithm 1 Level-set evolution algorithm with sparse finite elements: Active nodes and their values can be represented in a dynamic data structure (such as a vector or a list). The active complex $\mathcal{A}$ can be represented for example in a list structure.

```
 1: checkActivity(T):
 2: if T is a 1-simplex then
 3:    obtain the unique polynomial of degree p that
       interpolates the nodes of T
 4:    if the polynomial has at least one root inside
       T then
 5:       return active
 6:    else
 7:       return non-active
 8:    end if
 9: else
10:    for all boundary-simplices E of element T do
11:       if checkActivity(E) returns active then
12:          return active
13:       end if
14:    end for
15:    return non-active
16: end if
 1: activate(T):
 2: for all nodes V of element T do
 3:    if V ∈ $\mathcal{A}$ then
 4:       initialise V (extrapolate from active T-
          adjacent elements) {e.g. by averaging extrapolation
          values of all T-adjacent elements
          }
 5:    end if
 6: end for
 7: add element to $\mathcal{A}$
 8: return
```

```
 1: evolve(u,C):
    {Local Update:}
 2: compute $A_1, A_2$ and $b_1, b_2$ such that
    $z_j = A_j v + b_j$ {see (12), (13)}
 3: solve the least square equation
    $A^T(Av + b) = 0$ (e.g. using Conjugate
    Gradient method)
 4: u ← u + v {see (5)}
    {Global Update:}
 5: for all d-simplices T that were previously
    active (i.e. T ∈ $\mathcal{A}$) do
 6:    if checkActivity(T) returns active
       then
 7:       activate(T)
 8:    end if
 9: end for
10: for all T ∈ $\mathcal{A}$ do
11:    if checkActivity(T) returns non-
       active then
12:       remove T from $\mathcal{A}$
13:    end if
14: end for
15: return u
```

Algorithm 2 Level-set evolution algorithm with sparse finite elements.
The procedure evolve(u, C) is given in Algorithm 1 above.

1: estimate interface( ):
2: pre-process input data (e.g. smoothing of images, computation of image gradients)
3: set input parameters that the cost functional C might depend on (e.g. parameters in the density function γ)
4: specify computational region and simplex mesh $\mathcal{M}$
5: initialise level-set function u as sparse finite element complex $\mathcal{A}$
6: repeat
7:   evolve(u,C)
8: until converged
9: output interface Γ(u) {optional}
10: return Γ

The general motion we use can be a combination (e.g. a sum of) of several contributions. An example for such a contribution is given in the following and another one is for instance the so called balloon force $\beta = cg$ where $c \in \mathbb{R}$ is a constant and g: $\mathbb{R}^d \to \mathbb{R}$, a real valued function.

We now describe general density induced motion: Here we give details of the important case where the cost (assigned to interface Γ at time t) is the integral over a density γ:

$$C(\Gamma) := |\Gamma|_\gamma := \int_\Gamma \gamma(x, N(x), \rho(x,t), t) d\mu \quad (15)$$

where dμ is the standard Lebesgue measure (for Γ) and γ depends in general on the location $X \in \Gamma$ and orientation $N(x) \in S^{d-1}$ and additionally on a field ρ that we use to describe further, variable material properties on the interface Γ (such as reflectance):

$$\gamma: \mathbb{R}^d \times \mathbb{R}^d \times M \times \mathbb{R} \to \mathbb{R}, (x,N,y,t) \mapsto (x,N,y,t) \quad (16)$$

where y=ρ(x,t) and $$\rho: \mathbb{R}^d \times \mathbb{R} \to M, (x,t) \mapsto \rho(x,t) \quad (17)$$

which takes values in a differential manifold M. Using variational calculus, we get the following concise result (Theorem 1): Here equations (20), (21) and (22) show in conjunction with (24) how the interface speed integral of equation (13) may be determined. In particular, we derive expressions for the last term of equation (22) for various applications (e.g. for the example of 3D reconstruction one can use equation (71)).

Theorem 1. Density Induced Evolution:

The gradient descent for the cost $C(\Gamma)=|\Gamma|_\gamma$ gives the following partial differential equations (which we interpret in the weak sense):

$$\frac{\partial u}{\partial t} = \beta \quad (18)$$

$$\frac{\partial \rho}{\partial t} = \alpha \quad (19)$$

where the right hand sides are:

$$\beta = -\frac{\delta}{\delta \phi}\bigg|_{s.d.} C(\Gamma) = \text{div } V \quad (20)$$

-continued $$\alpha = -\frac{\delta}{\delta \rho} C(\Gamma) = -\nabla_y \gamma \quad (21)$$

with $$V := \gamma N + (1 - N \otimes N)\nabla_N \gamma \quad (22)$$

where N denotes the outward normal field to Γ and $N \otimes N = NN^T$. Here $\nabla_N$ denotes the partial gradient with respect to the second argument of γ.

Our approach differs from previous accounts. In particular:

Our strategy is to write a maximum of occurring terms as divergence—in fact it turns out that all terms are of this form.

The simple form of the result implies that we can work with the exact gradient descent and do not have to drop terms that involve 2nd order derivatives.

We simplify the computation by imposing the signed distance constraint.

We avoid local (arbitrary) parametrisations and look at the transport of various geometric quantities under normal motion instead.

The purpose of the following Proposition is to obtain numerical expressions for descent speed β as the analytical result of Theorem 1.

Proposition 2. Numerical Form of the Evolution Equation:

The general speed integral for normal motion can be performed element-wise:

$$\int_\Omega \psi \beta = \sum_T \int_T \psi \beta \quad (23)$$

where φ is an arbitrary test-function (usually one of the nodal basis functions) and the active area Ω is combined from the active d-simplices: $\Omega = \cup_{T \in A} T$.

If $e_i$ is a nodal basis function in T and β=div V, we compute the element-wise integral in the weak sense (using Stokes/Green's formula) as:

$$\int_T e_i \beta = \int_{\partial T_c} e_i \langle V, \mathcal{V}_c \rangle - \int_T \langle \nabla e_i, V \rangle \quad (24)$$

where $\mathcal{V}_c$ denotes the outward pointing normal to $\partial T_c$ and $\partial T_c = \Omega \cap \partial T$ is the boundary part of the active area Ω which is contained in T. The boundary is either empty ($\partial T_c = \emptyset$, which can happen only for d>2) or consists of the single (d−1)-simplex opposite vertex c (i.e. the simplex that contains all d+1 vertices of T except vertex c).

If, when restricted to element T, V can be written in the general form (Note that this form allows V to be an arbitrary polynomial over T. For efficiency, one can approximate a general v by low degree polynomials.):

$$V = \sum_{k_1,\ldots,k_n} \sum_j e_{k_1} \ldots e_{k_n} V^{(T)}_{k_1,\ldots,k_n;j} \nabla e_j \quad (25)$$

where $e_i$ denotes a nodal basis function in T and $V_{k_1,\ldots,k_n;j}^{(T)} \in \text{End}(\mathbb{R}^d)$ is a (constant) quadratic matrix. Then the element-wise integral equals:

$$\int_T e_i \beta - \sum_{k_1,\ldots,k_n,j} \begin{bmatrix} \int_{\partial T_c} e_i e_{k_1} \ldots e_{k_n} \langle \nabla e_j, \mathcal{V} \rangle_{V_{k_1,\ldots,k_n;j}^{(T)}} - \\ \int_T e_{k_1} \ldots e_{k_n} \langle \nabla e_i, \nabla e_j \rangle_{V_{k_1,\ldots,k_n;j}^{(T)}} \end{bmatrix} \quad (26)$$

For first order element (i.e. p=1) analytic integration yields:

$$\int_T e_i \beta = \quad (27)$$

$$|T| \sum_{k_1,\ldots,k_n,j} \left[ \begin{cases} d\, c_{i,k_1,\ldots,k_n}^{(d-1)} S_{jc}^{(T)}(V_{k_1,\ldots,k_n;j}^{(T)}) & i,k_1,\ldots,k_n \neq c \\ 0 & \text{else} \end{cases} \right.$$

$$\left. - c_{k_1,\ldots,k_n}^{(d)} S_{ij}^{(T)}(V_{k_1,\ldots,k_n;j}^{(T)}) \right]$$

where $c^{(d)}$ and $S^{(T)}$ are defined in (73) and (96) below. The term involving index c is only present if $\partial T_c \neq \emptyset$.

We now describe quadratic and geodesic motion: The following special form of the density γ gives an example of the general case and is the basis of the contour detection and the segmentation of volumetric images described below.

Definition 3. Quadratic Cost Density:

We call a cost-density (and the associated descent motion) quadratic if the density γ is of the form $$\gamma(x, N) := \frac{1}{2} |A(x)N|^2 \quad (28)$$

where A(x) is a symmetric matrix smoothly varying with $x \in \mathbb{R}^d$.

Note that $$\gamma = \frac{1}{2} \langle N, N \rangle_G$$

is linear in $$G := A^T A \quad (29)$$

furthermore we have in general $$\gamma = \frac{1}{2} \frac{\langle \nabla u, \nabla u \rangle_G}{\langle \nabla u, \nabla u \rangle} \quad (30)$$

$$\stackrel{s.d.}{=} \frac{1}{2} \langle \nabla u, \nabla u \rangle_G \quad (31)$$

where the last equation holds only in the signed distance case.

Proposition 4. Quadratic Motion:

The normal speed β=div V of the cost associated with (28) is given by:

$$V = GN - \gamma N \quad (32)$$

$$= \left(1 - \frac{1}{2} N \otimes N\right) GN$$

$$= HN$$

which is linear in $$H := G - \gamma 1 \quad (33)$$

We are now turning our attention to the case where the components of the symmetric matrix G are linear combinations of the nodal basis functions. In this way G is continuous over the whole domain Ω. We obtain the following result:

Proposition 5. Quadratic Speed for 1st Order Elements in Weak Form:

If $G = \Sigma_k e_k G_k$ with constant matrices $G_k \in \text{End}(\mathbb{R}^d)$ then:

$$\int_\Omega e_i \beta = -\frac{1}{d+1} \sum_{T \in A} |T| \left[ s_i + \begin{cases} s_c + (h_{ic} - h_{cc}) & (\partial T_c \subset \partial \Omega) \wedge (i \neq c) \\ 0 & \text{else} \end{cases} \right] \quad (34)$$

where we have defined $h_{ki}$ and $s_i$ by:

$$z := \sum_j u_j D_j^{(T)} \in \mathbb{R}^d \quad (35)$$

$$h_{ki} := \langle D_i^{(T)}, z \rangle_{G_k} - \frac{1}{2} \frac{\langle z, z \rangle_{G_k} \langle D_i^{(T)}, z \rangle_1}{\langle z, z \rangle_1} \quad (36)$$

$$\stackrel{s.d.}{=} \langle D_i^{(T)}, z \rangle_{G_k} - \frac{1}{2} \langle z, z \rangle_{G_k} \langle D_i^{(T)}, z \rangle_1 \quad (37)$$

$$s_i := \sum_k h_{ki} \quad (38)$$

and where the gradient vectors $D_i^{(T)} \in \mathbb{R}^d$ are given by (95) in the appendix. The $D_i^{(T)}$ are dependent on the mesh and concrete values are given in the section on first degree element integrals below.

Example: Special Quadratic Motion:

For instance, we can choose $$A := a1 + b \otimes b \quad (39)$$

a: $\mathbb{R}^d \to \mathbb{R}$ b: $\mathbb{R}^d \to \mathbb{R}^d$

This class actually covers all analytic functions with $b \otimes b$ as argument. This is true because the relation $(b \otimes b)(b \otimes b) = \langle (b,b) \rangle b \otimes b$ reduces any higher order terms in the Taylor expansion.

Corollary 6. Isotropic Geodesic Motion:

In the isotropic case γ(x,N)=g(x)

we have $$V = gN \quad (40)$$

if we assume that g is a linear combination of nodal basis functions ($g = \Sigma_k e_k g_k$) we can use (34). The expression for h and s in Proposition 5 simplify in this case to:

$$h_{ki} = g_k \langle D_i, z \rangle \quad (41)$$

$$s_i = (\Sigma_k g_k) \langle D_i, z \rangle \quad (42)$$

This case can also be seen as special case of the quadratic motion by setting: $A := \sqrt{2g} 1$.

Riemannian Geometry Interpretation:

g can be viewed as (isotropic) Riemannian metric since the associated cost is the Riemannian area (length in the 2D case) $C = \int_\Gamma g$.

Corollary 7. Curvature Motion:

If $\gamma(x, N)=1$ we have $$V = N \quad (43)$$

$$\int_\Omega e_i \beta = -\sum_{T \in A} |T| \left[ \langle D_i^{(T)}, z \rangle + \begin{cases} \langle D_c^{(T)}, z \rangle & (\partial T_c \subset \partial \Omega) \wedge (i \neq c) \\ 0 & \text{else} \end{cases} \right] \quad (44)$$

We now describe Initialisation of Level-Set Evolutions: The initialisation of level-set evolutions preferably requires an initial interface. Using the signed distance constraint [5], one can construct a level-set function that represents the prescribed interface implicitly. Given an analytic or numerical prescription of a shape in implicit form $\phi$ (examples are given below), the numerical representation of the level-set function u can be constructed as follows: having partitioned the computational domain into a simplicial complex (mesh) $\mathcal{M}$(examples of construction are described later) the next step is the definition of the sparse set of elements $\mathcal{A}$ that comprises the active simplices and values at the nodes. One simple way to construct the active elements is to check for each d-simplex of $\mathcal{M}$ if it contains parts of the interface. For instance, one can define the node-values to be given by evaluating $\phi$ at the node-locations. One can then define the element T and use checkActivity(T) of the above Algorithm 1 to decide if the element is active. If it is found to be active the element is added to the set $\mathcal{A}$ (e.g. represented as a list), otherwise it is discarded and the next element is examined.

In this section we discuss two sources of initialisation functions $\phi$: The first one embarks on a priori knowledge and can be used to initialise evolutions independent of any previous evolution. The second initialisation is indirect in that it relies on previous evolutions. The termination criteria below is of particular relevance to the indirect initialisation case where the end of one evolution starts a secondary evolution. We now describe direct initialisation techniques: In the most important example, the initial curve consist of the outline of an image and reflects the assumption that the objects of interest are fully contained in the image. However, we discuss more general options and demonstrate in particular the case of a single infinite line that allows us to capture non-closed contours such as sky-lines. A rich set of signed distance function initialisations can be obtained by transforming and combining two very basic distance functions, the ones corresponding to a point and a line.

We now describe an initialisation with elementary and transformed shapes: We define the signed distance functions of a point and a hyper plane (a hyper plane in d dimensions is of dimension d−1. In 2D this is a line.):

$$\phi_{point}(x) := |x| \quad (45)$$

$$\phi_{plane}(x) := \langle N, x \rangle \quad (46)$$

where $N \in S^{d-1}$ denotes the 'outward' normal of the region separated by the line. More interesting examples can be formed by transforming the space ($\mathbb{R}^d$) and the levels:

Spatial Transformations: Signed distance functions are symmetric under the Special Euclidean Group SE($\mathbb{R}^d$) and scaling: If $\phi$ is a signed distance map, $\phi(x) := \phi(x-T)$ is the signed distance map corresponding to a translation $T \in \mathbb{R}^d$ of the shape.

$\phi(x) := \phi(R^T x)$ is the signed distance map corresponding to a rotation (with fixed origin) by $R \in SO(d)$ of the shape.

$$-\psi(x) := s\phi\left(\frac{1}{s}x\right)$$

is the signed distance map corresponding to a scaling of the shape by a factor $s \in \mathbb{R}$..

Level Transformations: Signed distance functions are symmetric under shift and inversion of levels: If $\phi$ is a signed distance map, $\phi(x) := \phi(x) - \delta$ is the signed distance map corresponding to an expansion of the shape's interior by a distance $\delta$ in normal direction.

$\phi(x) := -\phi(x)$ is the signed distance map corresponding to the same shape but with an inversion of inside and outside (complement).

Figure 12:
FIG. 12 shows a sky-line contour detection example with a line as initial interface.

The use of a single line as initial shape is illustrated in FIG. 12.

Combining shapes: Implicit shapes can be combined (union and intersection) by corresponding min/max operations on the distance functions. Applying the transformations of the previous section to combined shapes, one can generate a manifold of further initialisation shapes.

If $\phi_1$ and $\phi_2$ are signed distance maps,

Union: $\phi(x) := \min(\phi_1(x), \phi_2(x))$ corresponds to the union of the interiors described by $\phi_1$ and $\phi_2$.

Intersection: $\phi(x) := \max(\phi_1(x), \phi_2(x))$ corresponds to the intersection of the interiors described by $\phi_1$ and $\phi_2$.

When combined with the level-inversion, this means that we can implicitly perform all usual operations that are known from set-theory on our shapes (complement, subtraction, union, intersection). In particular, in 2D we can now easily obtain signed distance functions of arbitrary closed polygons. For instance, we can obtain the outline of an image by intersecting the four lines of the image-borders (with normals pointing away from the image region).

We now describe initialisation based on other prior processes: Generally, the level-set can also be initialised by any other method that produces interface data or which output can be converted into interface data. We give the following two examples:

if an image (in d dimensions) is segmented into regions (e.g. using thresholding, graph-cut algorithms or otherwise), one can use this to initialise an interface which can then be refined using the methods presented in this document.

for the construction of the visual hull, one can detect contours in each of the multiple images, from the distance-to-contour function in 2D (obtained e.g. from a evolution of the detected contour with constant speed or otherwise for instance using the Fast Marching method), set up the corresponding distance-to-cone function in 3D (see below)), use the intersection method (above) to intersect the multiple cones.

We now describe distance-to-cone computation: If $y \in \mathbb{R}^3$ denotes a location in canonical camera coordinates [6], $$w(y) = \frac{1}{y_3} \vec{y}_1 y_2$$

the projection into the image, d(w) the signed distance to the surface. Then the distance to the visual cone is given by:

$$\phi cone(y) = \frac{y_3 d(w)}{\left\| \begin{pmatrix} w - d(w) \nabla d(w) \\ 1 \end{pmatrix} \right\|} \quad (47)$$

Figure 6:
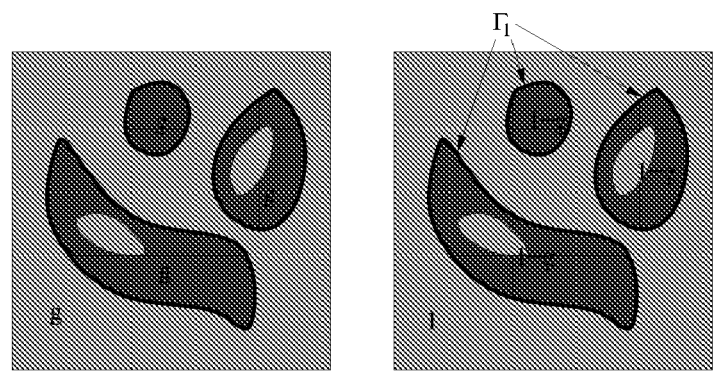
FIG. 6 shows the modification of an edge-detector function used for the detection of nested boundaries. Illustration in 2D.

We now describe indirect initialisation techniques: Indirect initialisations are useful when an evolution is to be based on the result of a previous related—but different—evolution. Examples of this case are given by:

Detection of all local minima: A general problem of the minimisation problem lies in the fact that a single evolution will only detect one of the possibly many local minima. We now give a method for nested contour detection: The general strategy is use the knowledge of a detected local minimum to drive the subsequent evolution into a different local minimum. The idea is to use two different Edge Detector functions g as illustrated in FIG. 6: The initial interface $\Gamma_0$ is first attracted to the local minima $\Gamma_1$ of C using g as edge detector. Subsequently, the evolution with a modified cost $\overline{C}$ is used to move the interface beyond the already detected minima. $\overline{C}$ is base on the edge-detector function $\overline{g}$ which is defined by using the already detected interface $\Gamma_1$:

$$\overline{g}(x) = \begin{cases} 1 - g(x) & \text{if } \phi_1(x) < 0 \\ 1 & \text{else} \end{cases} \quad (48)$$

Global distance to contour map: The numerical representation is, for computational efficiency, restricted to the vicinity of the interface $\Gamma$. However, once the interface is located, one can use a subsequent evolution with constant normal speed ($\beta$=1) to obtain the global continuation of the signed distance map.

Figure 7:
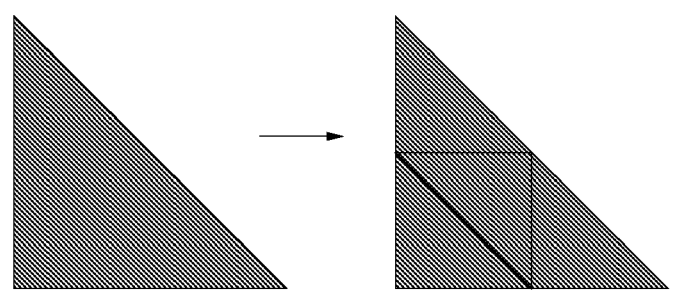
FIG. 7 shows an element sub-division procedure for resolution refinement. Illustration in 2D.

Multi-resolution techniques: In the finite element representation used, it is natural to consider refinements of elements (FIG. 7). Using initially a coarser resolution speeds up the convergence which is relevant for time critical applications (e.g. tracking).

FIG. 6: shows the Modification of the Riemannian Metric for the Detection of General Local Minima: (illustration in 2D) The original metric g (left) leads initially to the detection of contour $\Gamma_1$ and is replaced temporarily by $\overline{g}$ (right) to move the interface away from the already detected minimum.

FIG. 7: shows the Element Sub-division for Resolution Refinement: Illustration in 2D. The original element (left) is sub-divided into four triangles to double the resolution (right). The level-set function of the sub-divided elements is initialised to agree with the original function. This is possible because any coarse scale polynomial yields a polynomial of the same degree in the refined elements.

We now describe Evolution Control and Termination of Level-Set Evolutions: In some applications, the number of iterations can be estimated or predicted a-priori. In the following we are investigate methods for automatic termination in the absence of such prior knowledge. We analyse the convergence behaviour of level-set evolutions in the case where the evolution is derived from a cost functional C. We give two possible criteria:

the cost becomes stationary $$\frac{d}{dt}C \approx 0$$

the interface speed vanishes $\int_\Gamma \beta^2 \approx 0$

Figure 9:
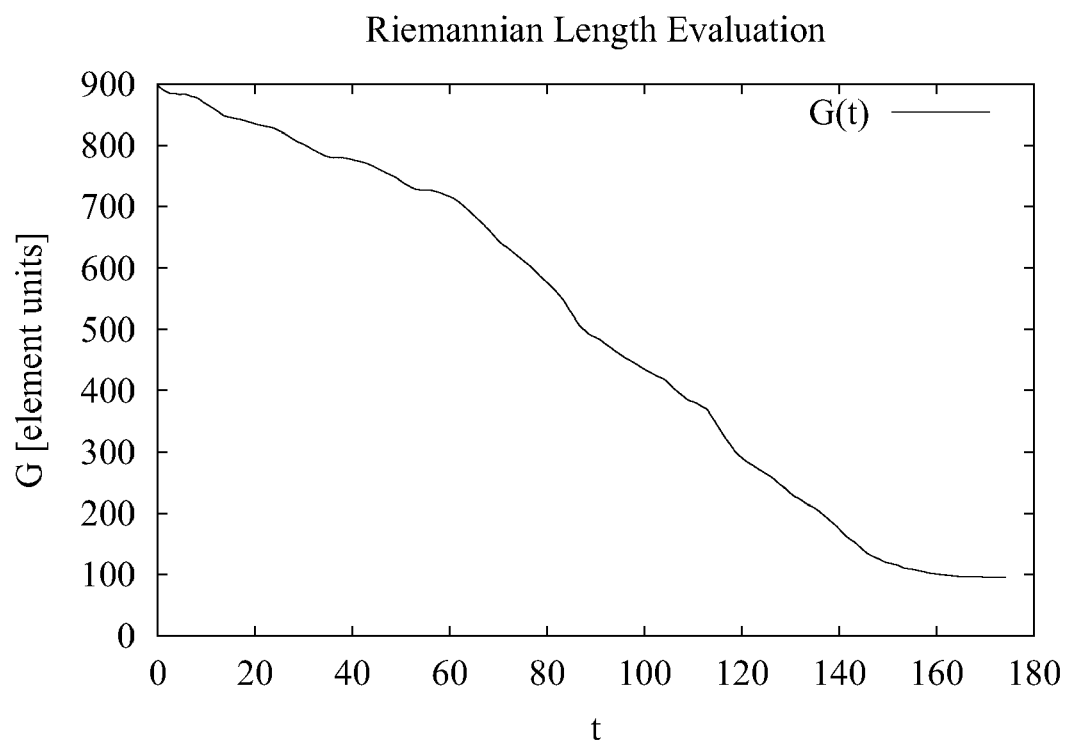
FIG. 9 shows an example of geodesic length variation during the evolution used in termination criteria.

In fact, the two criteria are related: for small deformations v of the level-set function u, the changes in cost C are given by: $C(u+v)-C(u) \approx -\int_\Gamma \beta v$ where we have written $\Gamma(u)=u^{-1}(0)$ for the zero level-set. In particular, pursuing the steepest descent $v=\Delta t\beta$ (with time step $\Delta t$) results in $\Delta C \approx -\Delta t \int_\Gamma \beta^2$ Where the computation of the cost is feasible, the first criterion is numerically preferable since the cost will stop to decrease at the point of convergence and one does not need to introduce a threshold (the finite accuracy of numerical computations will result in a small fluctuation) an experimental example is displayed in FIG. 9. The second criterion preferably includes a threshold because numerical fluctuations imply that the integral in this case will result in small, but non-zero positive values.

Figure 8:
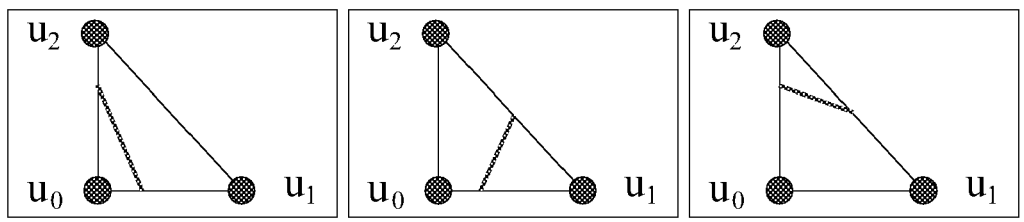
FIG. 8 illustrates in a 1st order 2D standard finite element three different examples of locations of the interface (line in each triangle).

We now describe the measuring zero level-sets and cost computation: The computation of various integrals can be performed as a sum over the contributions of all active elements. The contribution from an individual element can either be approximated or, in some cases computed analytically. As an example, we compute the Euclidean and Riemannian length of 1st order elements in 2D: Using the notation of FIG. 8) $k \in \{0, 1, 2\}$ denotes the index such that the sign of $u_k$ is different from the (equal) sign of the two other coefficients. We then obtain the following expressions for the length of the zero level-set in the element:

FIG. 8: shows Element Nodes: Three relevant examples of active elements. Each element of the complex is a standard simplex and $u_0, u_1, u_2$ denote the node values of the function u. The zero level-set of u is indicated (as line inside the triangle) for each example. For the element on the left, the sign of $u_k$ with k=0 differs from the signs of the other node values. Similarly, for the elements in the middle k=1 and on the right k=2.

$$L_1(U) = \frac{u_k\sqrt{(u_1-u_0)^2+(u_2-u_0)^2}}{\prod_{i \neq k}(u_i-u_k)} \quad (49)$$

$$L_g(U) = L_1(U)\sum_{i=0}^{2} y_i^{(k)}g_i \quad (50)$$

where $L_1$ denotes the Euclidean and $L_g$ the Riemannian lengths and where we have used $y^{(k)}_i$ defined by $$y_i^{(k)} := \frac{1}{2}\frac{u_k}{u_k-u_i} \text{ for } i \neq k \quad (51)$$

$$\sum_i y_i^{(k)} = 1$$

We now describe the Output of the interface $\Gamma$: By output we mean here the creation of a file (usually in a standardised format such as PostScript, VRML, mpeg etc.) from FIG. 9: shows a Geodesic Length Evaluation: The diagram shows the numerically computed values for the Riemannian length during (the first part of) the evolution from FIG. 10.

the estimated interface, material properties and possibly additional information (such as specification of view-points, animation data etc.).

We now describe an Output of Interfaces for 2D: In the first degree case (p=1), the interface is a line-segment inside each active element. The position of the line endpoints can be computed at the active 1-simplices (edges) of A. Therefore, one obtains a collection of polygons (if the interface is fully contained inside the represented area each polygon is a closed curve). The polygons can be exported into a number of standard graphics file formats (e.g. PostScript).

In the higher degree case (p>1), the interface inside each element can be approximated by parametric functions (e.g. splines) and exported into standard graphics file formats.

We now describe an Output of Interfaces for 3D: In the first degree case (p=1), the interface comprises one planar facet per active element. The facet is either a triangle or a quadrangle. The vertices of each facet can be computed at the active 1-simplices (edges) of A. Therefore, one obtains a collection of planar facets that can be used to generate a surface model (such as a indexed face set in VRML). The explicit surface model can be augmented with additional data (such a colour and reflectance data on each facet/vertex) and be exported into standard Computer Graphics file formats.

In the higher degree case (p>1), the interface inside each element can be approximated by parametric functions (e.g. splines) and exported into standard graphics file formats.

We now describe Output Techniques for Interfaces of Higher Dimension (d≧3): Interface data (including material properties) can be exported into a variety of application specific formats.

One can use affine slices (whose location and orientation can be controlled interactively) to export/visualise the intersection of the interface with the slice. In d dimensions, if a slice is given by d−2 affine equations in the d variables one can display/output the in-slice proportion of the interface as a collection of curves, like in the 2D case detailed above. This is possible because the restriction of the simplicial complex M (the mesh) to the slice is a 2-dimensional simplicial complex. Hence any d-simplex which contains parts of the section induces a 2-simplex in the slice. Furthermore, the node values for active elements can be computed by evaluating the element polynomial at the locations where nodes are placed in the slice.

similarly, if a section is given by d−3 affine equations in the d variables, one can display the interface-slice as a surface model as described earlier.

Another option, which can also be used in conjunction with the previously discussed sections, is to use time as an extra dimension. In fact, this can be implemented with the same methods as described for (spatial) slices with the difference that several slices are stored in the export file and assigned to different display-times. For instance a interface in 3D (a surface) can be exported as 2D movie by specifying a time-direction (in general a way of prescribing slices). Similarly, an interface in 4-dimensions can be exported as animated 3D surface model by prescribing slices.

Boundary Interface Detection

We describe here boundary detection methods which can be based on the present method. Particular examples for boundary detection in 2D and 3D include the contour detection in 2D images and the boundary-surface detection in volumetric images. The estimated interface Γ resulting from the application of the present method also implies a segmentation of space into areas outside and inside the interface. The segmentation can in particular be used to apply operations separately to the inside and outside; for instance one can cut out either inside or outside and copy and paste the contents into another image. One way to define boundaries in an image is to derive a cost functional C from the image data such that the local minima of C correspond to the desired boundary surfaces. We will detail several possible choices for such a cost below.

One can then start with an initial level-set function (which can contain the entire domain, be an approximate solution to the problem or be specified otherwise) and run the gradient descent scheme to refine the interface so that it approaches the desired boundary. The steps of a possible numerical algorithm are displayed below as Algorithm 3.

---

Algorithm 3 Boundary interface detection algorithm with sparse finite elements. The procedure evolve(u, C) is given in Algorithm 1 above.

1: boundaryInterface(image):
2:   smoothen image with Gaussian(σ)
3:   set any parameters that C might depend on
4:   define cost functional C {e.g. explicitly or as a function}
5:   initialise level-set u as sparse finite element complex $\mathcal{A}$
6:   repeat
7:     evolve(u,C)
8:   until converged
9:   output interface Γ(u) {optional}
10:  return Γ

---

We now describe a Boundary/Edge Detector Function: One simple edge detector function g is obtained by simply looking at the magnitude of the image gradient. For instance, we can let g(x) depend on the magnitude of change of the feature function $f$ (i.e. $|\nabla f|$). One possible function is for instance:

$$g := 1 - \exp\left(-\frac{a}{|\nabla f_\sigma|^q}\right) \tag{52}$$

where $f_\sigma$ denotes the smoothed version of the feature function $f$ obtained by convolution of $f$ with a Gaussian of width σ. Furthermore, a and q are real, positive constants that determine the response of the edge/feature detection.

The particular choice of $f$ depends on the application. For instance, one can choose $f(x)=I(x)$ where the image I can have scalar values (such as brightness e.g. in monochrome images) or values in some higher dimensional space such a RGB-space (one can deal with non-linear spaces by mapping them into linear ones; this amounts to consider the image $\tilde{I}:=\Phi \circ I$ instead of I, where Φ is a non-linear map.)

As another example for a choice of $f$, one can choose $$f(x) = \exp\left(-\frac{\eta}{2}(I(x)-\bar{y})^\top \sum^{-1}(I(x)-\bar{y})\right) \tag{53}$$

here, $\bar{y}$ is a fixed value, Σ is a covariance matrix and η a positive constant. For our examples, we obtain the covariance matrix by sampling m pixel-values $\{y_j\}$ in a user-defined region:

$$\bar{y} := \frac{1}{m}\sum_j y_j \quad \sum := \left(\frac{1}{m}\sum_j y_j y_j^\top\right) - \bar{y}\bar{y}^\top$$

In order to complete the definition of the edge detector function g, one can adjust the parameters a and q in (52) automatically to the image-data, for instance in such a way that the average gradient magnitude $\langle|\nabla f_\sigma|\rangle$ over the image results in g=½ and that the slope of g with respect to the gradient magnitude equals $-1/\langle|\nabla f_\sigma|\rangle$ at this point.

The particular functional form of g in (52) is not crucial. Usually g is monotonous with respect to $|\nabla f_\sigma|$ and one can normalise g for instance to have values in the unit interval [0; 1] such that $g \approx 1$ in edge/feature free areas (e.g. for small $|\nabla f_o|$)
$g \approx 0$ at edge/feature locations We now describe an Isotropic Geodesic Motion: One simple form of motion is obtained by choosing a Boundary Detector Function (see above for an example) as density:

$$\gamma(x, N) = g(x) \tag{54}$$

In this case, we refer to the density as Riemannian metric since the cost has the geometric interpretation of measuring Riemannian area. The attraction to the edges/features in the image is geometrically obtained by driving the evolution towards g-minimal surfaces (ie. surfaces $\Gamma$ that are local minima of $\int_\Gamma g$).

For the numerical realisation, one can choose for example to approximate/represent g as linear combination of nodal basis functions (see Corollary 6): $g = \Sigma_k e_k g_k$ with real coefficients $g_k$. The interface speed equations for the level-set update are particularly simple in this case and are readily obtained from Corollary 6.

We now describe the Quadratic Case: Here the cost C is the integral over a density which is of the form (28). One form of motion is obtained by defining a spatially varying (d×d)-matrix function G (see (29)). For example one can define the following matrix function:

$$G := 1 + \frac{g-1}{|\nabla I|^2} \nabla I \otimes \nabla I \tag{55}$$

where g can be an arbitrary edge detecting function (see above), for instance it can be of the form (52). Then G has the following properties:

alignment case (N∝∇I): we obtain GN=gN and hence geodesic motion.

non-alignment case (dI N=0): we obtain GN=N and hence curvature motion.

weak gradient case (∇I≈0): provided g→1 we obtain G→1 and hence curvature motion.

therefore, when compared to the isotropic geodesic motion, we obtain an additional aligning force, the strength of which depends on the pronounciation of the edge/feature and reduces to the isotropic case in the absence of a discriminative direction.

For the numerical realisation, one can choose for example to approximate/represent a general spatially varying matrix function G as linear combination of nodal basis functions (see Proposition 5): $G = \Sigma_k e_k G_k$ with constant matrices $G_k$. The interface speed equations for the level-set update are given in Propositions 4 and in particular the results for the 1st order case (p=1) are readily obtained in Proposition 5 above.

We now describe balloon force like term: The convergence of boundary detection can be combined with the extra speed term [2, 10, 4]:

$$\beta_{balloon} = cg \tag{56}$$

where g is an edge detector function. Two examples where it can be useful to add the above term to the cost-induced evolution are: the speed-up of the convergence and the counter-balance of other forces e.g. for the inflation of otherwise collapsing structures such as e.g. the circle in FIG. 11.

We now describe Nested interface detection: Nested boundaries can be detected by using a method like the 'inversion' of the edge-detector function above that was introduced in the context of initialisation. An example of an application in 2D can be seen in FIG. 10.

Contour Detection

In the present terminology, contours in 2D images are boundary interfaces for d=2 dimensions. Therefore, contours in particular can be detected by applying the boundary interface detection methods described above to the case of dimension d=2. The steps of a possible numerical algorithm are displayed below as Algorithm 4.

---

Algorithm 4 Contour detection algorithm with sparse finite elements. The procedure boundaryInterface(image) is given in Algorithm 3 above.

1: detectContour(image):
2: $\Gamma$=boundaryInterface(image)
3: output interface $\Gamma$ as collection of curves {optional}
4: return $\Gamma$

---

In the isotropic case, the cost $C = \int_\Gamma g$ has the interpretation of a Riemannian length. Note that by the earlier remarks on the detection of nested boundaries one can in particular detect nested contour structures automatically. We have included a few figures illustrating the boundary detection in 2D:

Segmentation of Volumetric Images

In the present terminology, the segmentation of 3D images is implied by boundary interfaces for d=3 dimensions (see above section on Boundary Interface Detection).

Figure 10:
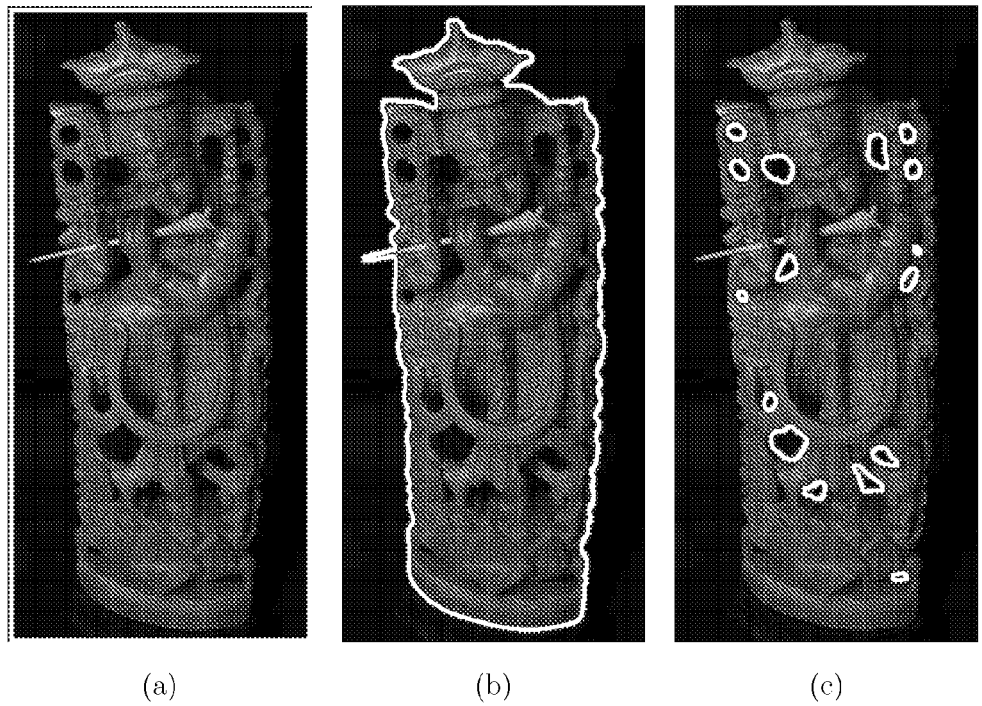
FIG. 10 shows a nested contour detection example: (a) trivial initial interface (square the size of the image), (b) detected outer contour and (c) detected nested contour (holes).

FIG. 10: Nested contour detection: (a) The outline of an image of a wooden Krishna-figure (266×560 pixels) is used to initialise the level-set function and to extract a Gaussian distribution of the background. (b) Geodesic minimisation (parameters: $\gamma=0.1$, $\sigma=2$, $c=0.4$) leads to the detection of the outer contour. Note the faithful capture of sculptural details such as the pipe which require a stabilised method. (c) Using our metric inversion method (see FIG. 6) the nested contours (holes) are detected automatically.

Figure 11:
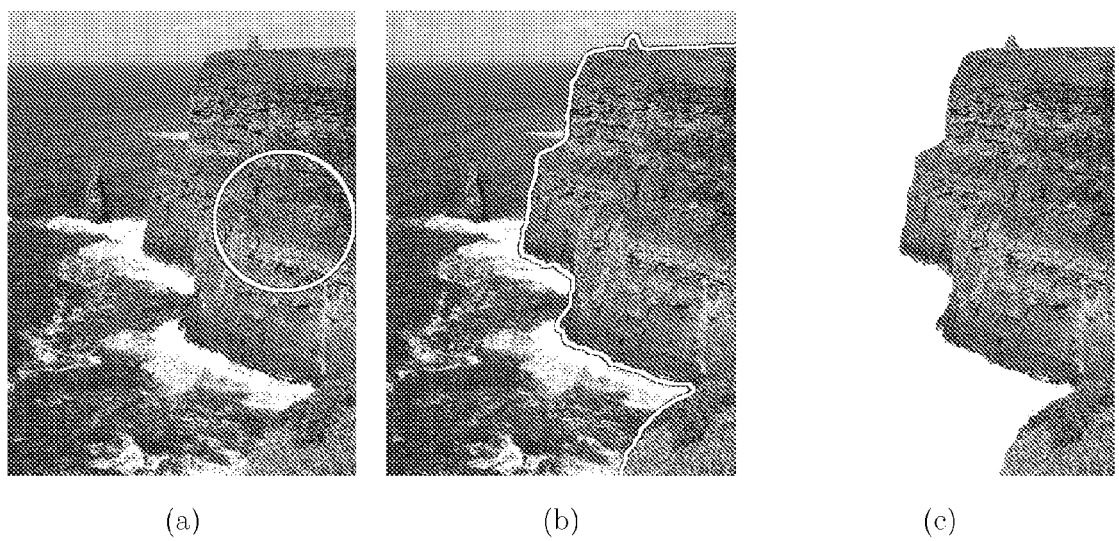
FIG. 11 shows a contour detection example with a circle as initial interface.

FIG. 11: Cliff example: The input image (384×512 pixels) is displayed in (a) with the user defined initial level-set superimposed. (b) shows the converged contour and (c) the obtained segmentation. In order to define the metric g, a Gaussian in rgb-space that represents the colour distribution inside the circle was defined ($\sigma=1.5$, $\gamma=10^{-1.5}$). A negative balloon-force (c=−0.3) was employed to 'inflate' the initial circle towards the boundaries of the region.

FIG. 12: Sky-line Example: Initialisation of a single line along the top of an image can be used to detect non-closed contours such as a 'sky-line'. The top part shows the initial curve and the bottom part the converged curve. A value of c=0.5 was used for the 'balloon force'.

Therefore, boundary surfaces in particular can be detected by applying the boundary interface detection methods described above to the case of dimension d=3.

The steps of a possible numerical algorithm are displayed below as Algorithm 5.

---

Algorithm 5 Boundary surface detection algorithm with sparse finite elements. The procedure boundaryInterface(image) is given in Algorithm 3 above.

1: boundarySurface(image):
2: $\Gamma$=boundaryInterface(image)
3: output interface $\Gamma$ as collection of curves {optional}
4: return $\Gamma$ Dense Reconstruction of Shape and Reflectance from Multiple Images We formulate the reconstruction problem as optimisation problem. Photometric consistency gives rise to cost term that measures the agreement with the available images of the scene. The photometric cost is in the first instance a cost induced by each image and the total cost a sum of those individual costs. We will re-formulate the cost as density over the interface Γ (i.e. the current shape estimate).

We obtain important additional information from the contours in the images: we use the contour information in two ways: first, to initialise the shape and secondly to constrain the evolution of the shape so that it maintains the agreement with the image-contours.

We now describe Experimental set-up: We assume that a number of images are taken of the same scene and also talk of an (image) sequence. We label the images of the scene by index i. Notably, we do not include the lighting in the scene description and consequently do in general not demand constant illumination throughout the sequence. Static scenes can be recorded with a single camera, where either the camera, the object or both are moved to obtain multiple views. Moving scenes can also be included by using (e.g. synchronised) multiple cameras. In the following, we will refer simply to the cameras, and treat them for in view of the reconstruction problem as one independent unit per image in the sequence. This is not to say that some or all of the cameras can not be physically the same device. Similarly, we talk of light-sources in the same way and talk of a light-source of image i and do not demand that some or all of the sources for different i are physically different devices.

We will describe below how cameras are modeled and calibrated. For some of the applications described below, it is also preferable to calibrate the light-sources. One example how to perform a light-source calibration from the image data can be found in [14, 13]. One possibility is to introduce an object of known shape into the scene from which the illumination can be determined.

We now describe single view estimation techniques:

This section prepares the multiple view techniques discussed later. Because we are dealing here with one separate image, we do not include an image index i, which will be used later when the results of this section are applied to image sequences.

We now describe Calibration: One can use several standard techniques to calibrate the cameras [6, 13]. One possibility is to introduce a number of markers or calibration object that can be located in various images. We assume here that the camera is performing geometrically a projection $\pi: \mathbb{R}^3 \rightarrow \mathbb{R}^2$, $x \mapsto w$ and performs photometrically a mapping of irradiance values into values represented in the image I as a function of the pixel position $w_j \in \mathbb{R}^2$ where we have labelled the pixels by index j. For instance, $\pi$ can be a perspective projection and can be described by a projection matrix:

$$\begin{pmatrix} w \\ 1 \end{pmatrix} \propto P \begin{pmatrix} x \\ 1 \end{pmatrix} \tag{57}$$

where P is a 3×4-matrix such that $\pi(x)=w$ is equivalent to (57). Furthermore, one can decompose the projection formally into two processes: a rigid body transformation (corresponding to possibility of moving a camera in 3-space) and a remaining so called intrinsic part. For instance, defining the intrinsic part as a upper triangular 3×3-matrix K one can decompose P=K[R|T] with the rigid body motion: $\Phi: \mathbb{R}^3 \rightarrow \mathbb{R}^3$, $x \mapsto y=Rx+T$ We call the point $-R^T T$ optical centre; it projects to 0. By the image-plane located in $\mathbb{R}^3$, we mean the plane characterised by $y_3=1$ in the above equation.

We now describe image and object area forms: Some cost functionals $C_i$ are formulated naturally in the image. In order to apply Theorem 1, we can reformulate the cost in terms of a density γ that 'lives' on the surface Γ. The following result is the key ingredient for the later application of the integral transformation formula.

Proposition 8. Induced Area Form:

The standard area form on the surface $\omega_\Gamma$ induces a 2-form ω in the image plane via the projection of a camera (R|T). Moreover, the 2-forms can be expressed in image coordinates w:

$$\omega = -\frac{y_3^3}{\langle N_*, y \rangle} dw_1 \wedge dw_2 \tag{58}$$

where y=Rx+T is the surface location $x \in \Gamma$ expressed in canonical camera coordinates and where $N_*=RN \in S^2$ is the (outward) surface normal in the same coordinate system.

We now describe Image Contour Constraint:

We aim to use the additional information provided by the detected 2D contours. Using a contour detection method (e.g. the one described earlier) one can obtain the contour as interface, segmenting the image into object locations (i.e. inside the interface) and background locations (i.e. outside the interface). The re-projection of a contour is a cone that is obtained as the union of rays originating at the optical centre and passing trough a contour location in the image-plane (we refer to it as the contour-cone). A constraint posed by the contour on the shape is then that the shape has to be fully contained inside the cone.
along each cone-line lies at least one object location (and the object is tangential to the cone at any of such locations)

One use of the contour information can therefore be used for the initialisation of the interface: if d: $\mathbb{R}^2 \rightarrow \mathbb{R}$, $w \mapsto d(w)$ is the signed distance map of the contour, we can construct the distance-to-cone map as described earlier, see equation (47). The intersection of those cones from multiple views will later yield an implicit description of the visual hull.

A second use of the contour information is to include a constraint into the overall optimisation problem which enforces that the outline of the projection of the shape evolving under gradient descent of the cost will continue to project to the contour. We will detail below give an example of such a constraint.

We now describe Model Projection:

One way to facilitate the numerical implementation for various evolution problems (examples of which are described later) is to perform a projection of the model into the image plane.

For instance, in the case of 1st order elements, the interface comprises triangular facets (quadrangles that can also occur can be split into pairs of triangles). The projection of each triangle corresponds to a triangle in the image plane whose vertex-locations can be obtained simply by projecting the implicit vertices of the facet.

In the following we will construct a subset of these triangles in the image plane by demanding that each triangle is associated with a visible facet. For simplicity, we demand here that the facet be fully visible by the camera. This can be checked efficiently by checking if any triangles in the image-plane intersect and by discarding at each intersection the triangle that is further apart from the camera (i.e. whose $y_3$ value at the intersection is larger). One obtains in this way a simplicial complex which covers parts of the image-plane.

In the case of the photometric reconstruction below, one can additionally remove any triangles that are not fully illuminated by the light-source, reducing the number of admissible triangles in the complex.

For some applications, one can also discard further triangles e.g. those which contain image gradients above a selected threshold.

We now describe reconstruction as optimisation problem:

We now describe Initialisation using Contours (visual hull): We describe below how the shape and reflectance can be represented using the present invention. Before we discuss various possible gradient descent schemes, we present a method to initialise shape (i.e. the interface). One suitable initialisation is given by intersecting the contour-cones of the images in the sequence to obtain the visual hull. We can then set up the level-set function, as described earlier in the context of level-set initialisations, by taking the maximum of the distance-to-cone maps. Hence, one obtains an initial level-set function with the visual hull as its implied interface.

We now describe Reconstruction Cost Functional:

We formulate the problem of reconstruction as optimisation problem and aim to evolve the initial interface to refine the initial shape. Each image delivers data on (a part of) the scene and induces a consistency cost. The cost can be considered to be a measure for the discrepancy between the (current estimate of) shape $\Gamma$ and reflectance $\rho$. The objective of the following is to set up a gradient descent scheme in order to minimise this cost and arrive at an estimate that is optimal in the space of our object-model (shape+reflectance).

We define the cost induced by all images to be the sum $$C(\Gamma) := \sum_i C_i(\Gamma) + \epsilon_u \int_\Gamma 1 + \epsilon_\rho \int_\Gamma |\nabla \rho|^2 \qquad (59)$$

where $C_i$ denotes the cost induced by each individual image. The choice of $C_i$ depends on the application and we will describe various examples below. Furthermore, $\epsilon_u \geq 0$ can be used to impose a smoothness term to the shape (minimising the surface area of the interface) and $\epsilon_\rho \geq 0$ can be used to impose a smoothness term effectively limiting the variation of reflectance parameters.

Proposition 9. Cost C in the Images Induces Density $\gamma$ on the Surface:

We write the cost C as a density $\gamma$ that is integrated over the surface $\Gamma$. We obtain:

$$C = \int_\Gamma \gamma \qquad (60)$$

$$C_i = \int_\Gamma \chi_i \gamma_i \qquad (61)$$

$$\gamma = \sum_i \chi_i \gamma_i \qquad (62)$$

-continued $$\gamma_i(x, N) = ([z_i(x, N) - I_i(\pi_i(x))]^2 + \text{contour terms}) \frac{\langle N, R^\top y \rangle}{y_3^3} \qquad (63)$$

where $\chi_i$ is the visibility function:

$$\chi_i(x) = \begin{cases} 1 & x \text{ visible in camera } i \\ 0 & \text{else} \end{cases} \qquad (64)$$

An example of a generic numerical algorithm is given in 6.

---

Algorithm 6 Algorithm for the reconstruction of 3D objects from multiple 2D images. The procedure evolve(u, C) is given is Algorithm 1 above.

1: 3D-model(images):
2: Calibrate cameras (intrinsic parameters and motion)
3: Calibrate Light-sources {only required if the C depends on light-source variables}
4: for all image i do
5:   $\gamma_i$ =detectContour(image i)
6: end for
7: compute visual hull
8: initialise level set-function u from visual hull
9: initialise reflectance function (least square parameter estimation assuming initial shape)
10: set up parameters for cost C
11: repeat
12:   evolve(u,C)
13: until converged
14: output interface $\Gamma(u)$ and reflectance $\rho$
15: return

---

We now describe Lambertian reflectance: Assuming that the object obeys approximately Lambertian reflectance and that the illumination (preferably diffuse) remained approximately constant throughout the image sequence, we can describe the reflectance by a simple albedo value $\rho \in \mathbb{R}^c$, where c is the number of colour-bands (e.g. 1 for monochrome, 3 for rgb). A possible cost functional for image i is given by:

$$C_i(\Gamma) = \int_{\pi_i(\Gamma)} [z_i(x(w)) - I_i(w)]^2 dw_1 \wedge dw_2 + \alpha \int_{\mathbb{R}^2} [\chi_{O_i} - \chi_{\pi_i(\Gamma)}]^2 \qquad (65)$$

where the first term compares the modelled intensities with the observed pixel intensities and the second term (with weight $\alpha$) enforces the consistency with contours in the image by penalising deviations from the image segmentation $O_I \subset \Lambda^2$. In this expression, $\pi_i$ denotes the perspective projection of camera i, x(w) is the re-projection of w (i.e. the closest point x on $\Gamma$ for which $w=\pi_i(x)$) and z: $\mathbb{R}^3 \to \mathbb{R}^c$ (c=3 for rgb-images). The prediction of image intensities is in this case simply given by:

$$z_i(x) = \rho(x) \qquad (66)$$

In order to initialise the evolution one can use the visual hull as initial shape (as described earlier) and define the initial albedo map $\rho$ for instance by averaging the re-projected pixel intensities. Note that this is an optimisation problem in the albedo map alone while the shape is not varied at this stage.

Having initialised, one can now run the scheme described earlier to refine shape and albedo simultaneously. The light estimation in Algorithm 6 above is here not required. The cost can be transformed into a density using Proposition 9 and Theorem 1 can be applied to evolve the shape and reflectance. For the numerical computation, we can for instance choose to represent ρ as linear combinations of nodal basis functions and the components of V in Theorem 1 as linear combination of products (e.g. of second order) of nodal basis functions.

We now describe Photometric Consistency and a Cost Functional:

In this case we define the cost induced by an individual image by $$C_i := \int_{\pi_i(\Gamma)} [z_i(x(w)) - I_i(w)]^2 dw_1 \wedge dw_2 + \alpha \int_{\mathbb{R}^2} [\chi_{O_i} - \chi_{\pi_i(\Gamma)}]^2 \quad (67)$$

where the first term compares the modelled intensities with the observed pixel intensities and the second term (with weight α) enforces the consistency with contours in the image by penalising deviations from the image segmentation $O_i \subset \mathbb{R}^2$. In this expression, $\pi_i$ denotes the perspective projection of camera i, x(w) is the re-projection of w (i.e. the closest point x on Γ for which w=$\pi_i$(x)) and z: $\mathbb{R}^3 \to \mathbb{R}^c$ (c=3 for rgb-images) denotes the model intensity-prediction:

$$z_{i\lambda}(x) := \int_{S_+^2} \rho_\lambda(x, l, \upsilon)\langle l, N\rangle S_\lambda(x, l) d\Omega \quad (68)$$

where the integration is with respect to. l and where ρ represents the (parametric) BRDF, $l_f \in S^2$ is the light-source direction and $S_l$ the intensity of the light source. For the case of a single point-light source this simplifies to:

$$z_{i\lambda}(x,N) := \rho_\lambda(x,N)\langle l_i(x),N\rangle S_{i\lambda}(x) \quad (69)$$

where we have not written explicitly the dependence of ρ of light source and viewing direction l(x), s(x). For Lambertian reflectance, ρ is independent of N: $\nabla_N \rho$=0. Extended light sources can be modelled as sums/integrals over point-light sources.

Note that the integral is formulated in the image plane as the space where the actual measurements are made (Indeed, this implies for instance that from a single view there is a flat direction in the cost related to an arbitrary scale. This is in contrast to methods that involve a direct area term in the cost which tends to shrink the surface by penalising area.).

One can again utilise Proposition 9 to turn the cost into density form and to apply Theorem 1 for the evolution of shape and reflectance (analogous to the Lambertian case). However, due to the varying illumination, we use a modified 'visibility' function $\chi_i$ in place of the one displayed in Proposition 9:

$$\chi_i(x) = \begin{cases} 1 & x \text{ visible in camera } i \text{ and} \\ & \text{illuminated by light } i \\ 0 & \text{else} \end{cases} \quad (70)$$

Proposition 10. Derivative of Density (for Evolution):

We obtain the following derivative:

$$\nabla_N \gamma_i = \frac{1}{y_3^3}\left[(z_i - I_i)^2 R^\top y + 2\langle N, R^\top y\rangle \sum_\lambda (z_i - I_i)_\lambda \nabla_N z_{i\lambda}\right] \quad (71)$$

$$\nabla_N z_{i\lambda} = \rho_\lambda S_{i\lambda} l_i + S_{i\lambda}\langle l_i, N\rangle \nabla_N \rho_\lambda \quad (72)$$

For the numerical computation, we can for instance choose to represent the components of V in Theorem 1 as linear combinations of products (e.g. of second order) of nodal basis functions.

As in the Lambertian case, one can initialise the shape using the visual hull, optimise the reflectance parameters with the fixed initial shape and refine the shape and reflectance estimates simultaneously as described in Algorithm 6.

Element Integral Computation

We describe here the computation of particular constants for a general partition of space which are used in the above procedures.

We now describe General Element Integrals: We derive analytic expressions for the required integral quantities. First, we compute general integrals over products of nodal basis functions. Secondly we show how differential operators can be reduced to those products. The general formulation introduced here applies for arbitrary space-dimension d and element polynomial degree p. We present detailed results only for the 1st order case since it is less laborious to obtain and easier to implement.

We now describe Product Integrals for the general case of p-th order elements in d dimensions:

Proposition 11. Product Integral Invariants

Let T be an arbitrary affine image of the standard simplex. Let $e_i^{(T)}$ denote the nodal basis function of the (transformed) node i. Then $$c_{i_1 i_2 \ldots i_k}^{(d)} := \frac{1}{|T|}\int_T e_{i_1}^{(T)} e_{i_2}^{(T)} \ldots e_{i_k}^{(T)} \quad (73)$$

is invariant with respect to the shape of the d-simplex T.

Proposition 11 makes integral evaluations very practical by reducing the determination of a few universal constants $$c_{i_1 i_2 \ldots i_k}^{(d)}$$

(which can be computed for instance on the standard simplex) and the computation of the simplex area |T|.

Proposition 11 also implies that product integrals are invariant to permutations of the standard simplex-vertices (e.g. the 'rotation' $0 \mapsto b_1, b_1 \mapsto b_2, \ldots, b_d \mapsto 0$). (To see this let T be the 'rotated' version of $T_0$).

Analytic Computation of Product Integral Constants:
  Proposition 18 computes the values of general product integrals for 1st order elements (i.e. p=1).
  General integrals for higher order elements (p>1) can also be obtained analytically. Furthermore, they are easily derived from the 1st order case by remarking that any nodal basis function of a p-th order element can be written as a p-linear combination $$\sum_{i_1,\ldots,i_p} a_{i_1,\ldots,i_p} e_{i_1}^{p=1} \ldots e_{i_p}^{p=1}$$

with symmetric coefficients $a_{i_1,\ldots,i_p}$ (This is obvious since the basis function is in the space of p-th order polynomials (in d variables) and we can generate this space with the stated combinations.).

We now describe Derivative Operators and Products: Our level-set schemes use the evaluation of integrands that involve derivatives such as:

$$\langle \nabla e_i^{(T)}, \nabla e_j^{(T)} \rangle_A \tag{74}$$

$$\langle \nabla e_i^{(T)}, \mathcal{V} \rangle_A \tag{75}$$

where A is a symmetric matrix (e.g. $A \propto 1$ in Corollary 6) and $\mathcal{V}$ is going to be the normal of some boundary simplex. The following observation reduces the occurring terms to (linear combinations of) nodal basis function products, for which we can apply Proposition 11.

Proposition 12. Derivative Operators

Derivatives are linear operators on the nodal basis functions. In particular, the gradient can be linearly combined as:

$$\nabla e_i^{(T)} = \sum_a e_a^{(T)} D_i^{(T)a} \tag{76}$$

or $$\partial_\mu e_i^{(T)} = \sum_a e_a^{(T)} D_{i,\mu}^{(T)a} \tag{77}$$

where $D_i^{(T)a} \in \mathbb{R}^d$.

Note, that the gradient is defined in terms of T-coordinates. We therefore have to bear in mind that derivative operators (and hence also $D^{(T)}$) are dependant on the transformation:

Proposition 13. Transformation of Gradient Components

If the affine $f$ transforms $T_0$ into T, we have:

$$D_i^{(T)a} = (Df)^{-\top} D_i^{(0)a} \tag{78}$$

Simplification for 1st order Elements:

If p=1, the gradient is constant and we can drop the index a:

$$D_i^{(T)} := D_i^{(T)a} \tag{79}$$

for any a.

As application of Proposition 12, we obtain:

Corollary 14. Gradient Product Components $$\langle \nabla e_i^{(T)}, \nabla e_j^{(T)} \rangle_A = \sum_{a,b} e_a^{(T)} e_b^{(T)} S_{i,j}^{(T)ab} \tag{80}$$

where $$S_{i,j}^{(T)ab}(A) := \langle D_i^{(T)a}, D_j^{(T)b} \rangle_A \tag{81}$$

which accounts for the metric transformation (note that if $A \propto 1$ this depends only on T and not on $f$ (since the right hand side is then invariant to rotations and translations)).

The partition of unity property implies that ($\forall a, b$):

$$\sum_i S_{i,j}^{(T)ab} = 0 \tag{82}$$

$$\sum_j S_{i,j}^{(T)ab} = 0 \tag{83}$$

which implies that for the computation of $S^{(T)}$ it is sufficient to know $$S_{i,j}^{(T)ab} \text{ for } i, j > 0.$$

Similarly, we obtain:

Corollary 15. Gradient Components $$\langle \nabla e_i^{(T)}, \mathcal{V}^{(T)} \rangle_A = \sum_a e_a^{(T)} U_i^{(T)a} \tag{84}$$

where we have defined:

$$U_i^{(T)a} := \sum_{j,b} \mathcal{V}_j S_{i,j}^{(T)ab} e_b^{(T)} \tag{85}$$

on writing the vector $\mathbf{v}^{(T)}$ as the linear combination $$\mathcal{V}^{(T)} = \sum_j \mathcal{V}_j \nabla e_j^{(T)} \tag{86}$$

By the nodal basis defining property, we have $\nabla e_i$ is orthogonal to any boundary simplex which does not contain node i. Proof: $e_i$ vanishes identically because it vanishes on all nodes of that simplex (and is a polynomial of the same degree on that simplex) (For 2nd order elements there can be sub-simplices that do not contain node i).

We now describe 1st Degree Element Integrals: The situation is particularly simple for 1st order elements and we present the details of this important case here. We begin by gathering some facts regarding the basis functions of the standard simplex:

Lemma 16. Nodal Basis of the Standard Simplex

The nodal basis functions on $T_0^{(d)}$ are simply given by $$e_i(x) = x_i \forall\, i > 0 \tag{87}$$

$$e_0 = 1 - \sum_{i>0} e_i$$

Lemma 17. Gradient Operator for $T_0^{(d)}$

$$(D_i^{(0)a})_\mu =: (D_i^{(0)})_\mu = \begin{cases} \delta_{i\mu} & (i > 0) \\ -1 & (i = 0) \end{cases} \tag{88}$$

We now return to the case of general simplices T.

Proposition 18. Product Integral Constants

For first order elements we find for the constants of Proposition 11:

$$c_0^{(d)} = \frac{1}{d+1} \tag{89}$$

$$c_{00}^{(d)} = \frac{2}{(d+1)(d+2)} \tag{90}$$

$$c_{01}^{(d)} = \frac{1}{(d+1)(d+2)} \tag{91}$$

$$c_{000}^{(d)} = \frac{6}{(d+1)(d+2)(d+3)} \tag{92}$$

$$c_{001}^{(d)} = \frac{2}{(d+1)(d+2)(d+3)} \tag{93}$$

$$c_{012}^{(d)} = \frac{1}{(d+1)(d+2)(d+3)} \tag{94}$$

and all other product integral constants with up to 3 factors follow from this. Gradient terms are particularly simple in the 1st order case because they are constant:

Lemma 19. Gradient Product Components:

For the $f$-transformed gradient ($T = f(T_0)$) we obtain the constants:

$$(D_i^{(T)})_\mu = \begin{cases} (Df^{-1})_{i\mu} & (i > 0) \\ -\sum_{j>0}(Df^{-1})_{j\mu} & (i = 0) \end{cases} \tag{95}$$

which implies for the gradient products:

$$S_{ij}^{(T)ab}(A) =: S_{ij}^{(T)}(A) = \langle D_i^{(T)}, D_j^{(T)} \rangle_A \tag{96}$$

where the entries of any column or row sum up to 0 (see above). In particular for the standard simplex we get $$S_{ij}^{(0)} = A_{ij} \text{ if } i, j > 0.$$

Proposition 20. Boundary Normals and Integrals: Let $v_c$ denote the outward normal of the d−1 simplex $\partial T_c$ opposite node c. Representing with nodal basis gradients (86) we obtain:

$$\mathcal{V}_c^{(T)} = -\frac{1}{|\nabla e_c^{(T)}|} \nabla e_c^{(T)} \tag{97}$$

which can be used to express scalar products with nodal gradients:

$$U_{ic}^{(T)} := \langle \nabla e_i^{(T)}, \mathcal{V}_c \rangle_A = -\frac{1}{|\nabla e_c^{(T)}|} S_{ic}^{(T)} \tag{98}$$

which allows us to compute general boundary integrals: if A is constant, we obtain:

$$\int_{\partial T_c} \psi \langle \nabla e_k^{(T)}, \mathcal{V}_c \rangle_A = -dS_{kc}^{(T)}|T| \frac{1}{|\partial T_c|} \int_{\partial T_c} \psi \tag{99}$$

or for monomial components $\phi = e_{i_1} \ldots e_{i_n}$:

$$\int_{\partial T_c} e_{i_1} \ldots e_{i_n} \langle \nabla e_k^{(T)}, \mathcal{V}_c \rangle_A = \begin{cases} -dS_{kc}^{(T)}|T| c_{i_1 i_2 \ldots i_n}^{(d-1)} & i_1, \ldots, i_n \neq c \\ 0 & \text{else} \end{cases} \tag{100}$$

The boundary integral formula by Gauβ/Stokes/Green implies the following relation:

$$\sum_c \int_{\partial T_c} \psi \langle \nabla e_k^{(T)}, \mathcal{V}_c \rangle_A = \int_{\partial T} \psi \langle \nabla e_k^{(T)}, V_c \rangle_A$$

$$\stackrel{\text{Stokes}}{=} \int_T \text{div}(\psi A \nabla e_k^{(T)})$$

$$= \int_T \langle \nabla \psi, \nabla e_k^{(T)} \rangle_A$$

where in the last step we have used the fact that 2nd order derivatives of 1st order nodal basis functions vanish. We therefore get in monomial components:

$$\left(\sum_{c \notin \{i_1, \ldots, i_n\}} S_{kc}^{(T)}\right)(-d)\, c_{i_1 i_2 \ldots i_n}^{(d-1)} = \sum_{l=1}^n S_{i_l,k}^{(T)} c_{i_1, \ldots, \hat{i_l}, \ldots, i_n}^{(d)} \tag{101}$$

which, by setting n=0, can be used as an alternative proof of $$\sum_c S_{kc}^{(T)} = 0.$$

By choosing different (e.g. $(A)_{\mu\nu} = \delta_{\mu i}\delta_{\nu j}$) A (and hence S) it can also be used to prove recursive relations for $c^{(d-1)} \to c^{(d)}$.

Simplex Meshing of Space

There are many ways to partition (parts of) d-dimensional space into a simplicial complex $\mathcal{M}$. For instance, one can use Delaunay triangulations/tetrahedrisations as described in [3].

In the following we give examples of such decompositions for 2D and 3D. All documents, patents and publications referred to herein are incorporated by reference for any purpose.

We now describe 2D Regular Mesh: 2-space can be partitioned by using (translated versions of) the standard simplex $T=T_0$ and its mirror image T'. The decomposition is sometimes referred to as Freudenthal triangulation.

We summarise the following quantities required for our element-wise integrals. Obviously we have d=2 and $$|T| = |T'| = \frac{1}{2}.$$

Furthermore, for p=1 we get:

$$D_0^{(T)} = \begin{pmatrix} -1 \\ -1 \end{pmatrix} \quad D_1^{(T)} = \begin{pmatrix} 1 \\ 0 \end{pmatrix} \quad D_2^{(T)} = \begin{pmatrix} 0 \\ 1 \end{pmatrix} \tag{102}$$

$$D_0^{(T')} = \begin{pmatrix} 1 \\ 1 \end{pmatrix} \quad D_1^{(T')} = \begin{pmatrix} -1 \\ 0 \end{pmatrix} \quad D_2^{(T')} = \begin{pmatrix} 0 \\ -1 \end{pmatrix}$$

where the first row follows directly from (88) while the second is obtained from the first with Df=−1 in (78).

We obtain the gradient products by inserting the above $D^{(T)}$, $D^{(T')}$ into (96):

$$S^{(T)}(A) = S^{(T')}(A) = \begin{pmatrix} \cdot & \cdot \\ \cdot & A \end{pmatrix} \in \text{End}(\mathbb{R}^3) \tag{103}$$

where the omitted entries are such that each row/column sums up to 0. In particular, if A=1 this simplifies to:

$$S^{(T)}(1) = S^{(T')}(1) = \begin{pmatrix} 2 & -1 & -1 \\ -1 & 1 & 0 \\ -1 & 0 & 1 \end{pmatrix} \tag{104}$$

We now describe 3D Regular Delaunay Mesh: 3-space cannot be partitioned by just using translated/rotated versions of the standard simples $T_0^{(3)}$. However, one can obtain a simple partitioning as the Delaunay Tetrahedrisation of the following vertex set:

$$(2\mathbb{Z}^3) \cup ((1,1,1)^T + 2\mathbb{Z}^3) \tag{105}$$

which consists of even and odd vertices. The induced simplicial complex is particularly simple since it has a lot of symmetry:

- all 3-simplices (tetrahedrons) are of the same shape (ie. translated and rotated versions of one 3-simplex $T\left(\text{volume } |T| = \frac{2}{3}\right)$.

- all 2-simplices (faces) are of the same shape (one edge along a coordinate direction, and two across edges).
- there are two types of 1-simplices (edges): edges along the coordinate directions are of length 2 and the 'across' type of edges which are of slightly shorter length $\sqrt{3}$.

for instance, one can define the vertices of one simplex T to be:

$$p_0 = (0, 0, 0)^\top \tag{106}$$

$$p_1 = (2, 0, 0)^\top \tag{107}$$

$$p_2 = (1, -1, 1)^\top \tag{108}$$

$$p_3 = (1, 1, 1)^\top \tag{109}$$

we then get:

$$D_0 = \frac{1}{2}(-1, 0, -1)^\top \tag{110}$$

$$D_1 = \frac{1}{2}(1, 0, -1)^\top \tag{111}$$

$$D_2 = \frac{1}{2}(0, -1, 1)^\top \tag{112}$$

$$D_3 = \frac{1}{2}(0, 1, 1)^\top \tag{113}$$

$$S^{(T)}(1) = \frac{1}{4}\begin{pmatrix} 2 & 0 & -1 & -1 \\ 0 & 2 & -1 & -1 \\ -1 & -1 & 2 & 0 \\ -1 & -1 & 0 & 2 \end{pmatrix} \tag{114}$$

And one can obtain similar formulas for the rotated versions.

Figure 13:
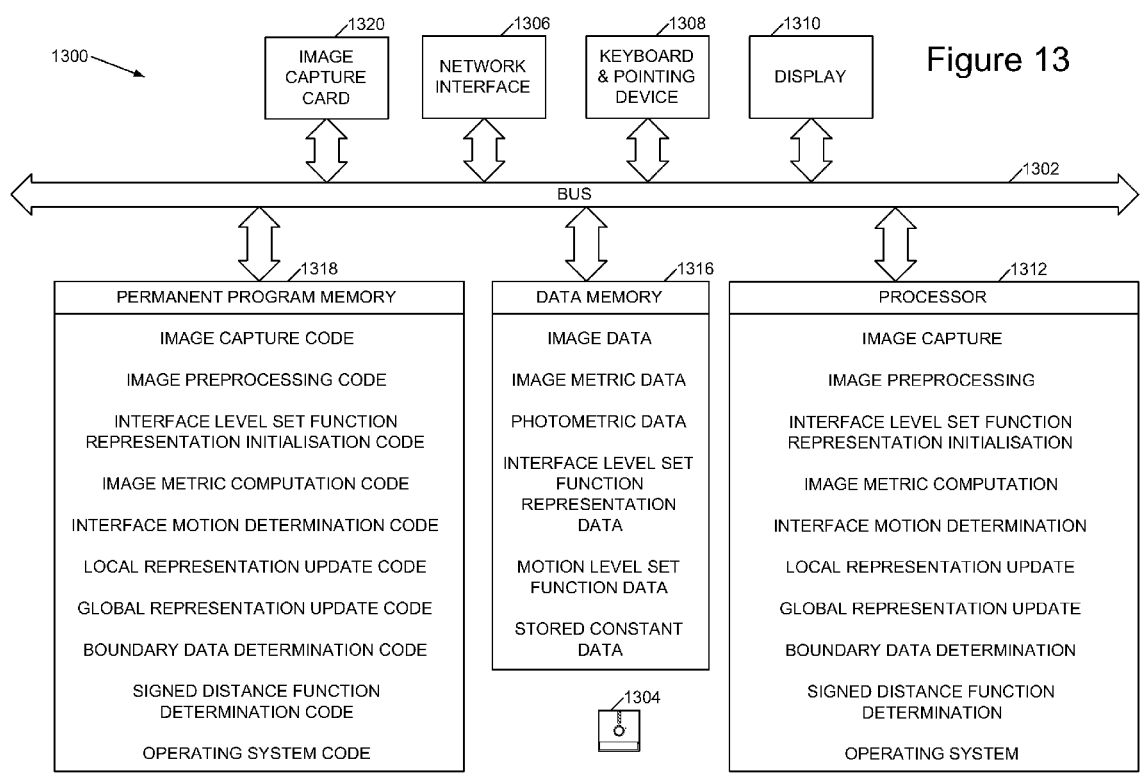
FIG. 13 shows a general purpose computer system 1300 programmed to implement the above described methods.

FIG. 13: Shows a General Purpose Computer System.

Figure 14:
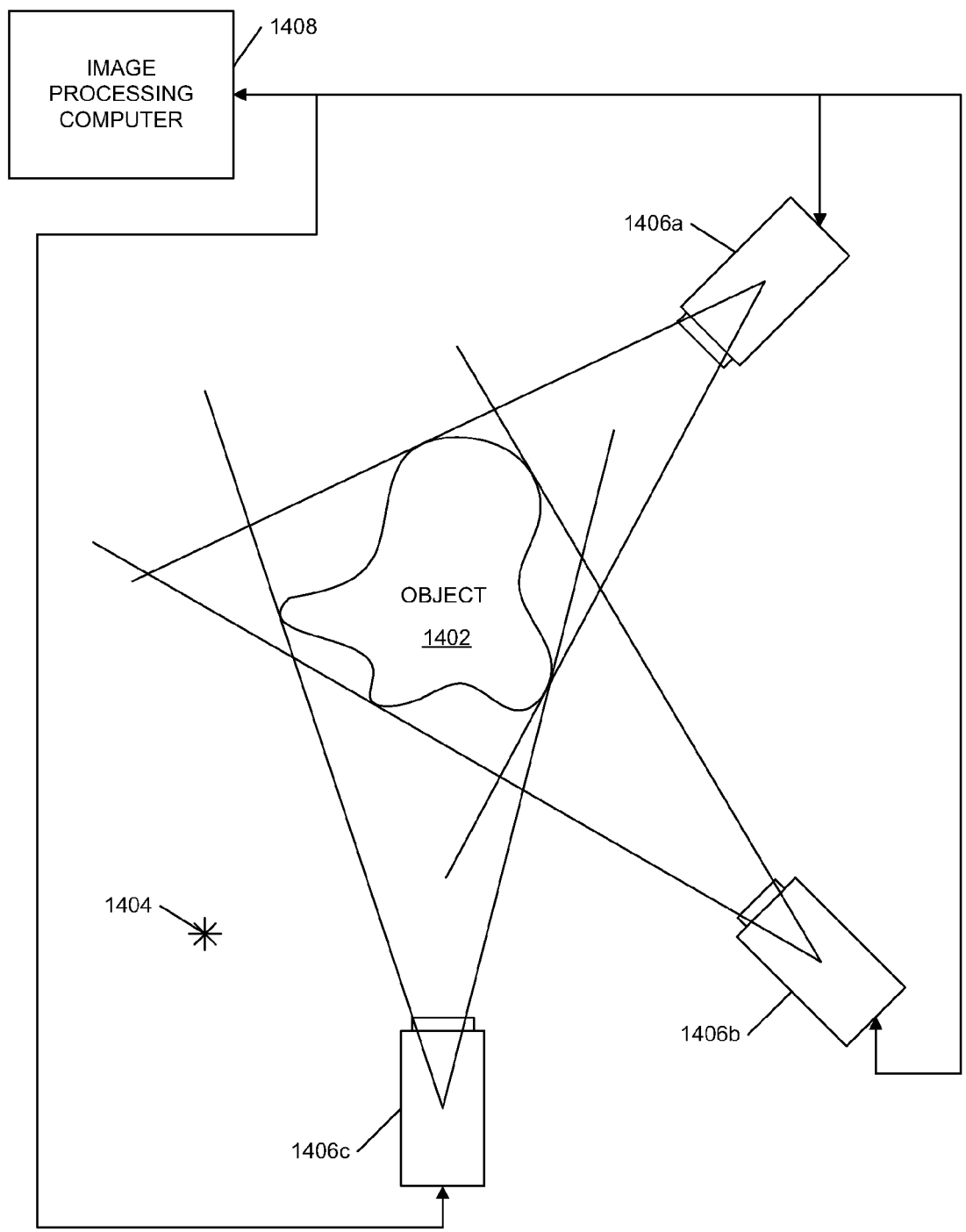
FIG. 14 shows an image processing system.

FIG. 14: shows an image processing system suitable for implementing embodiments of the present invention FIG. 13 shows a general purpose computer system 1300 programmed to implement the above described methods. The computer system includes a data and control bus 1302 to FIG. 15: shows an outline of a procedure for implementing an embodiment of the present invention which is connected a processor 1312, data memory 1316 and program memory 1318. Also connected to bus 1302 is a display 1310 and keyboard and pointing device 1308 to provide a user interface, a network interface card 1306 for interfacing to a local area network for exchange of data with other devices for example for image capture or to provide processed image data to other devices for further processing. An image capture card 1320 is provided for capturing an image from a digital camera.

The program memory 1318 is preferably non-volatile and the program code in the program memory and/or the data in the data memory may be written to and/or read from a portable storage media, illustratively shown by floppy disk 1304. The permanent program memory 1318 includes operating code (for example Microsoft Windows, trade mark), optional user interface code (not shown), image capture code, image preprocessing code, interface level set function representation initialisation code, image metric computation code, interface motion determination code, local representation update code, global representation update code, boundary data determination code, and optionally signed distance function determination code. This code is implemented by processor 1312 to provide corresponding functions as described above. The data memory 1316 stores image data, image metric data, in a preferred embodiment photometric data, interface level set function representation data, motion level set function data, and values for stored constants for the image processing. The code in program memory may comprise code in any conventional program language or may comprise instructions in a dedicated image processing language, for example C++.

Computer system 1300 is suitable for directly interfacing with a digital camera such as previously described. In other embodiments an image data input to the computer system may be provided via a portable storage or a computer network and the image capture card 1320 dispensed with. Images may be provided to the computer system in any convenient format.

Referring now to FIG. 14, this shows an image processing system 1400 suitable for implementing embodiments of the present invention. An object 1402 is illuminated by one or more light sources 1404 and one or more cameras 1406a, b, c capture views of the object from different angles. The image data from these cameras is provided to image processing computer 1408, for example similar to the computer system described above with reference to FIG. 13. In other systems input may be from, for example, a medical imaging system (and need not comprise an image/pixels of a regular shape).

Figure 15:
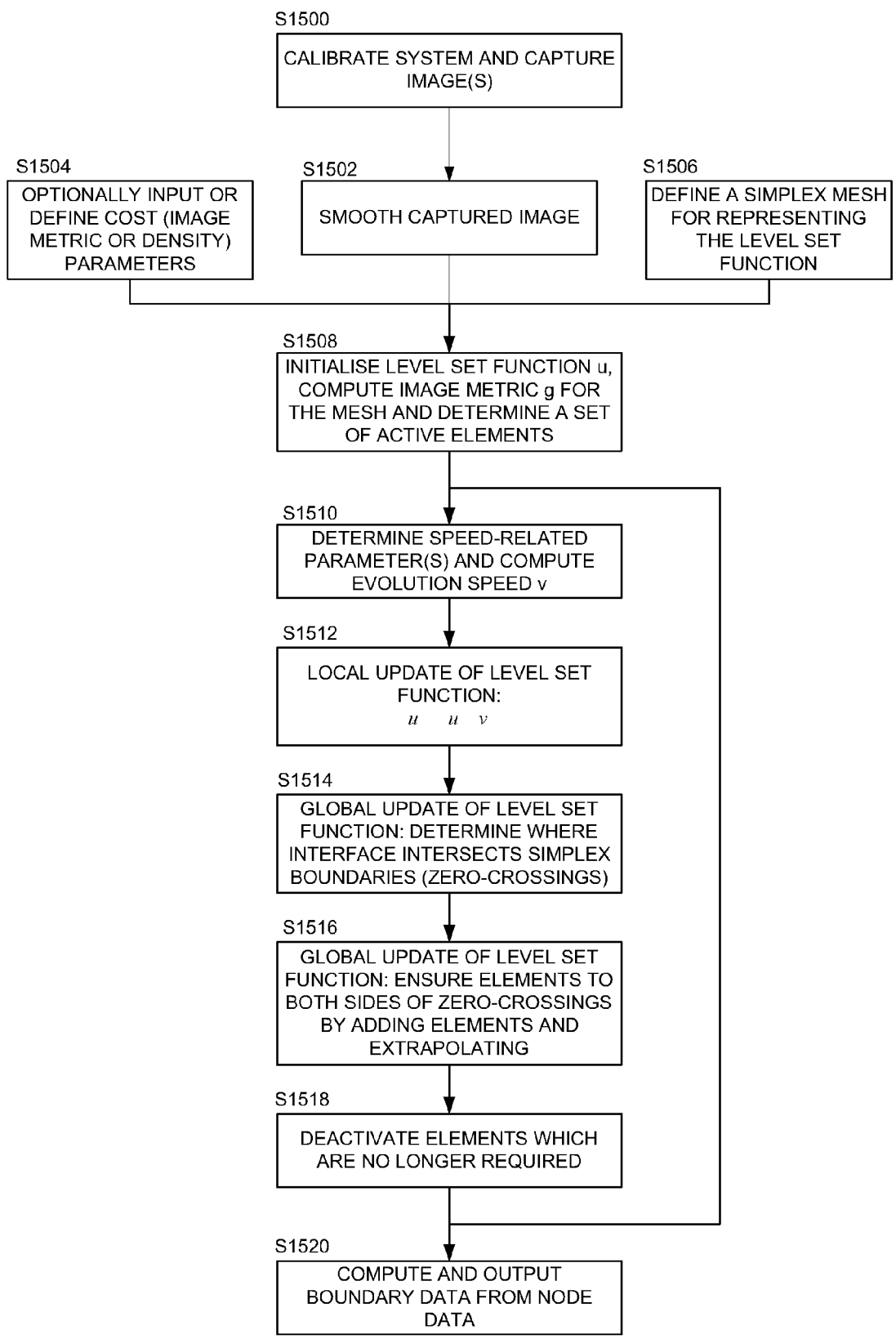
FIG. 15 shows an embodiment of an image processing procedure embodying an aspect of the present invention.

FIG. 15 shows an outline of a procedure for implementing an embodiment of the present invention. At step S1500 the system is (optionally) calibrated and one or more images captured, for example by means of cameras such as cameras 1406 of FIG. 14 or from some other source such as a medical imagine device. The images may be in colour or monochrome. At step S1502 the captured image is preferably smooth and at step S1504 provision is made for input of one or more cost parameters of an image metric or density which is employed. For example where the image metric comprises a Riemannian measure of distance such as that mentioned under the summary of the invention above, parameters for the metric may comprise constants defining the strength and decay properties for an edge. In parallel with this at step S1506, the procedure defines a simplex mesh for representing the level set function, for example comprising one triangle per pixel. Then, at step S1508, the procedure initialises a level set function u and computes and image metric g for the mesh (for example from Equation 54), and determines a set of active elements (triangles) as described further below.

At step S1510 the procedure determines one or more speed-related parameters (for example (of equation 18 above) and computes an evolution speed v for the level set function (for example using equation 20 above in which a predetermined value for c (balloon force), which relates to speed of convergence, such as 0 or 0.5 may be employed). Then at step S1512 the procedure locally updates the level set function, for example by summing values of u and v at each simplex node. Following this a global update of the level set function is performed (S1514) in which the procedure first determines where the interface intersects simplex element boundaries (edges in 2D, faces in 3D) (zero crossings). This is straightforward as where the interface crosses a boundary of a simplex on one side a node has a positive value and on the other side of the interface a node has a negative value. At step S1516 the global update procedure then ensures that there are simplex elements to both sides of zero crossings by, where necessary, adding elements and extrapolating. It will be understood in this context that preferably both u and v comprise a sparse representation in which only a small part of the simplex mesh is "active", for example active elements being defined in an associated list. The image metric, by contrast, is defined over the region of the image. At step S1518 the procedure deactivates simplex elements which are no longer required and then loops back to step S1510 to again determine the speed of interface motion; the procedure may loop for a predetermined number of iterations or until a predetermined degree of convergence is achieve. Then once the condition for the loop to cease is met the procedure computes and outputs boundary (interface) data from the simplex node data (S1520).

Optionally following step S1520 the computation may be re-run using the output boundary data as an initialisation and with a constant (normal) speed (to determine a signed distance function for the image area. This may be employed where it is desired to output signed distance function data (for example using a conventional finite element type representation).

The skilled person will understand that the determination of the speed of motion of the interface at step S1510 may take account of, for example, object reflectance as described above. Furthermore where images from multiple cameras are available multiple speed values may be determined, in effect one for each (active) pixel in each image, that is the pixels which produce the object's projection in the image plane, thus allowing a speed to be allocated to each active image pixel (the interface being moved in a normal direction as described in detail above).

No doubt many effective alternatives will occur to the skilled person and it will be understood that the invention is not limited to the described embodiment but encompasses modifications within the spirit and scope of the claims appended hereto.

One application of the 3D models generated by the above method is to assemble several 3D models and/or animated 2D and 3D scenes which contain models generated with the above method in a digital photo album. Such as collection of images combined with search and sorting functions (known for instance in the context of data bases) can be used very much in the same way a physical photo albums are used but with the additional functionality of control over the viewpoint and advanced search options. The album can be either implemented as a software on standard computers (e.g. PC, Mac) or involve more specialised hardware including visualisation techniques for stereo-vision (such a 3D television sets, shutter glasses etc.)

We have described
- a new implicit representation of interfaces (e.g. curves and surfaces) comprising a efficiently only a sparse set of finite elements.
- a method to complete the geometric interface by additional so called material properties
- an efficient way to evolve the interface in reasonable runtime even on standard PCs.
- a general and accurate scheme to evolve interfaces in arbitrary finite dimension, hence implying applications such a contour detection, boundary surface detection in volumetric images, 3D reconstruction.
- accurate gradient descent equations of the general class of density induced cost functionals in numerical form.
- enhanced stability by the incorporated signed distance constraint
- general Method to estimate/extract curves, surfaces and general interfaces in higher dimensions from digital data (e.g. images).
- a new method to reconstruct 3D objects and their reflectance data from 2D images.

The invention claimed is:

1. A method of processing digital image data representing an image of an object to determine data representing a boundary for said object, the method comprising:
    inputting said image data;
    initialising a level set function representation of an interface for approximating said boundary;

determining a motion of said interface subject to a combined cost function comprising a first cost comprising a signed distance constraint on said interface level set function representation and a second cost comprising a measure of said interface responsive to a density or metric of said image;

modifying said level set function representation of said interface in accordance with said determined motion;

repeating said determining and modifying such that said interface converges on said boundary; and determining boundary data representing said boundary from said converged level set function interface representation.

2. A method is claimed in claim 1 further comprising representing said interface level set function using a data structure comprising a subdivision of said image into a plurality of elements each having a plurality of nodes, each node being associated with a value of said level set function.

3. A method is claimed in claim 2 wherein each said element comprises a simplex and wherein said plurality of elements comprises a simplicial complex.

4. A method is claimed in claim 2 wherein said data structure includes data to determine active ones of said elements, a said active element comprising an element for which values of said level set function are determined in said level set function representation, and wherein said active ones of said elements comprise elements which contain said interface.

5. A method is claimed in claim 4 wherein said modifying of said interface level set function further comprises determining active ones of said elements for said modified interface, setting as active ones of said elements containing said modified interface, and determining values for said level set function for nodes of said elements set as active by extrapolation from values of said level set function for nodes of previously active ones of said elements.

6. A method is claimed in claim 1 wherein said determining of said motion determines a level set function representation of said motion.

7. A method is claimed in claim 1 wherein said density or image metric comprises a function having a value which changes as said boundary is approached, and wherein said interface measure changes responsive to said changing motion such that said motion reduces as said interface approaches said boundary.

8. A method is claimed in claim 7 wherein said combined cost function comprises a substantially affine function of said motion.

9. A method is claimed in claim 7 wherein said combined cost function has a coefficient substantially linearly dependent upon said density or image metric.

10. A method of determining visual hull data for a three dimensional object comprising inputting data for a plurality of images of said object from a corresponding plurality of viewpoints;

determining boundary data for each of said inputted images according to the method of claim 1; and combining said boundary data to determine said visual hull data.

11. A method as claimed in claim 1 wherein said digital image data comprises two dimensional data representing an image of a three dimensional said object, wherein said boundary comprises a three dimensional boundary and wherein said combined cost function includes a reflectance cost whereby said converged interface defines a three dimensional approximation to said boundary.

12. A method is claimed in claim 11 wherein said image data represents a view of said object from a viewing point, and wherein said motion is evaluated at a plurality of points within said image each corresponding to an intersection of a ray from said viewing point with said object.

13. A method is claimed in claim 11 wherein said object is illuminated by a light source, and wherein said reflectance cost is dependent upon light source data representing said light source, the method further comprising updating said light source data during said repeated motion determining and interface modifying.

14. A method is claimed in claim 11 wherein said digital image data comprises data representing a plurality of views of a three dimensional object from a corresponding plurality of viewpoints, and wherein said repeated motion determining and interface modifying determines boundary data consistent with said image data for said plurality of views.

15. A computer readable medium comprising a non-volatile memory having computer executable instructions for performing the method of claim 1.

16. A method of processing digital image data representing an image of an object to determine data representing a boundary for said object, the method comprising:

inputting said image data;

initialising a level set function representation of an interface for approximating said boundary, said level set function being represented using a data structure comprising a subdivision of said image into a plurality of elements each having a plurality of nodes, each node being associated with a value of said level set function;

determining a motion of said interface subject to a cost function comprising a measure of said interface responsive to a density or metric of said image;

modifying said level set function representation of said interface in accordance with said determined motion;

repeating said determining and modifying such that said interface converges on said boundary; and determining boundary data representing said boundary from said converged level set function interface representation.

17. A method of processing digital image data representing an image of an object using a level set function representation of an interface within said image, the method comprising:

representing said interface level set function using a data structure comprising a subdivision of said image into a plurality of elements each having a plurality of nodes, each node being associated with a value of said level set function, said data structure further comprising data to determine active ones of said elements, a said active element comprising an element for which values of said level set function are determined in said level set function representation, and wherein said active ones of said elements comprise elements which contain said interface;

modifying said interface level set function;

determining actives ones of said elements for said modified interface; and determining values for said level set function for nodes of said elements determined as active for said modified interface by extrapolation from values of said level set function for nodes of previously active ones of said elements.

18. A computer readable medium comprising a non-volatile memory having computer executable instructions for performing the method of claim 17.

19. A computer system for processing digital image data representing an image of an object to determine data representing a boundary for said object, the system comprising:

a digital image input for said digital image data;

program memory storing processor control code;
data memory for storing image data for processing; and
a processor coupled to said digital image input, and to said data memory, and to said program memory for loading and implementing said stored code, said code comprising code for controlling said processor to;
input said image data;
initialise a level set function representation of an interface for approximating said boundary;
determine a motion of said interface subject to a combined cost function comprising a first cost comprising a signed distance constraint on said interface level set function representation and a second cost comprising a measure of said interface responsive to a metric of said image;
modify said level set function representation of said interface in accordance with said determined motion;
repeat said determining and modifying such that said interface converges on said boundary; and
determine boundary data representing said boundary from said converged level set function interface representation.

20. A computer system for processing digital image data representing an image of an object to determine data representing a boundary for said object, the system comprising:
a digital image input for said digital image data;
program memory storing processor control code;
data memory for storing image data for processing; and
a processor coupled to said digital image input, and to said data memory, and to said program memory for loading and implementing said stored code, said code comprising code for controlling said processor to;
input said image data;
initialise a level set function representation of an interface for approximating said boundary, said level set function being represented using a data structure comprising a subdivision of said image into a plurality of elements each having a plurality of nodes, each node being associated with a value of said level set function;
determine a motion of said interface subject to a cost function comprising a measure of said interface responsive to a density or metric of said image;
modify said level set function representation of said interface in accordance with said determined motion;
repeat said determining and modifying such that said interface converges on said boundary; and
determine boundary data representing said boundary from said converged level set function interface representation.

21. A computer system for processing digital image data representing an image of an object, the system comprising:
a digital image input for said digital image data;
program memory storing processor control code;
data memory for storing image data for processing; and
a processor coupled to said digital image input, and to said data memory, and to said program memory for loading and implementing said stored code, said code comprising code for controlling said processor to;
construct a level set function representation of an interface within said image in said data memory using a data structure comprising a subdivision of said image into a plurality of elements each having a plurality of nodes, each node being associated with a value of said level set function;
modify said interface level set function;
determine active ones of said elements for said modified interface, setting as active ones of said elements containing said modified interface;
determine values for said level set function for nodes of said elements determined as active for said modified interface by extrapolation from values of said level set function for nodes of previously active ones of said elements; and
processing said level set function values for said active elements.

* * * * *